(12) United States Patent
Datta et al.

(10) Patent No.: US 7,024,472 B1
(45) Date of Patent: Apr. 4, 2006

(54) SCALEABLE PROCESSING OF NETWORK ACCOUNTING DATA

(75) Inventors: Utpal Datta, Bedford, NH (US); Timothy C. Landon, Bedford, NH (US); Kevin Farrell, Windham, NH (US)

(73) Assignee: Nortel Networks Limited, St. Laurent (CA)

( * ) Notice: Subject to any disclaimer, the term of this patent is extended or adjusted under 35 U.S.C. 154(b) by 572 days.

(21) Appl. No.: 09/574,011

(22) Filed: May 19, 2000

(51) Int. Cl.
G06F 15/173 (2006.01)
(52) U.S. Cl. ...................................... 709/223
(58) Field of Classification Search ................ 709/223
See application file for complete search history.

(56) References Cited

U.S. PATENT DOCUMENTS

| | | | |
|---|---|---|---|
| 5,630,184 A | 5/1997 | Roper et al. | |
| 5,781,735 A * | 7/1998 | Southard | 709/224 |
| 5,784,553 A | 7/1998 | Kolawa et al. | |
| 5,887,139 A | 3/1999 | Madison, Jr. et al. | |
| 5,903,732 A | 5/1999 | Reed et al. | |
| 5,996,009 A | 11/1999 | Kitamura et al. | |
| 6,014,702 A | 1/2000 | King et al. | |
| 6,078,321 A | 6/2000 | Simonoff et al. | |
| 6,101,500 A * | 8/2000 | Lau | 707/103 R |
| 6,133,916 A | 10/2000 | Bukszar et al. | |
| 6,272,641 B1 | 8/2001 | Ji | |
| 6,282,709 B1 | 8/2001 | Reha et al. | |
| 6,473,085 B1 | 10/2002 | Brock et al. | |
| 6,502,130 B1 * | 12/2002 | Keeler et al. | 709/223 |
| 6,523,022 B1 | 2/2003 | Hobbs | |

OTHER PUBLICATIONS

XACCT Usage Overview, XACCT Technologies, 1997.
HP and Cisco Deliver Internet Usage Platform and Billing and Analysis Solutions (http://www.hp.com/smartinternet/press/prapr28.html), Hewlett Packard Company, 1998.
Article, Quadri, et al., *Internet Usage Platform White Paper* (http://www.hp.com/smartinternet/solutions/usagewp.), Hewlett Packard Company, 1998.
Article, *Strategies for Managing IP Data* (http://www.hp.com/smartinternet/press/not.html), Hewlett Packard Company.

(Continued)

Primary Examiner—Jason Cardone
Assistant Examiner—Jeffrey R. Swearingen
(74) Attorney, Agent, or Firm—Withrow & Terranova, PLLC

(57) ABSTRACT

A data collection system includes a plurality of node host computers. Each node host computer has a node manager, at least one processing node and a data manager. The data manager delivers network records between processing nodes. The processing nodes include an input queue and an output queue. In some embodiments at least one of the nodes has a plurality of output queues. The processing nodes are arranged in configurable chains of processing nodes. The chains are disposed across one or more of the plurality of host computers to process network records. The at least one processing node having the plurality of output queues can couple records from the plurality of output queues to input queues of corresponding processing nodes, based on a selected distribution method and/or selected content of records. The system can include an administrative client that displays a graphical user interface and an administrative server communicating with the node host computers and the administrative client. The administrative server stores files of executable code that can be dynamically downloaded from the server to configure the client and change the graphical user interface dynamically while the graphical user interface is running. A node deletion process is also described.

40 Claims, 31 Drawing Sheets

OTHER PUBLICATIONS

Article, Nattkemper, *HP and Cisco Deliver Internet Usage and Billing Solutions* (http://www.interex.org/hpworldnews/hpW806.html), Hewlett Packard Company, Jun. 1, 1999(?).

*HP Smart Internet Billing Solution* (http://hpcc925.external.hp.com/smartinternet/solutions/usagebilling.html), Hewlett Packard Company, 1998.

*HP Smart Internet Usage Analysis Solution* (http://www.hp.com/smartinternet/solutions/usageanalysis.html), Hewlett Packard Company, 1998.

Press Release, *New Cisco IOS NetFlow Software and Utilities Boost Service Provider Revenues and Service Management Capabilities* (http://www.cisco.com/warp/public/cc/cisco/mkt/gen/pr/archive/cros_pr.htm), Cisco Systems, Inc., Jul. 1, 1997.

Documentation, *NetFlow FlowCollector 2.0* (http://www.cisco.com/univerca/cc/td/doc/product/rtrmgmt/nfc/nfc_2_0/index.htm), Cisco Systems, Inc., 1998.

Article, Mary Jander, *Hot Products: Network Management—Usage Monitoring Intranet Inspector* (http://www.data.com/issue/990107/manage3.html), Tech Web, CMP Media Inc., Jan. 1999.

Article, Loring Wirbel, *Tools coming for probing, billing of IP packets* (http://www.techweb.com/se/directlink.cgi?EET19981214S0033), EETIMES, Issue 1039, Section: Systems & Software, Dec. 14, 1998, CMP Media Inc.

Article, Loring Wirbel, *Tools enable usage-based billing on the Net* (http://www.eetimes.com/story/OEG19981208S0007), EETIMES, Dec. 8, 1998, CMP Media Inc.

Article, Limor Schweizer, *Meeting the IP Network Billing Challenge* (http://www.tmcnet.com/tmcnet/articles/xacct1298.htm), TMCnet, Dec. 1998(?).

Product Review, *XACCTusage* (http://www.xacct.com/news/xuoverview.htm), internet.com, Internet ProductWatch (?).

Article, Loring Wirbel, *In next-generation networks, ISPs are calling the shots* (http://www.techweb.com/se/directlink.cgi?EET19981019S0058), EETIMES, Issue 1031, Section Communications, Oct. 19, 1998, CMP Media Inc.

Article, Kate Gerwig, *ISPs Take 'Do-It-Yourself' Tack With Billing* (http://www.internetwk.com/news1098/news101398-3.htm), CMP's Tech Web, CMP Media Inc., Oct. 12, 1998.

Article, Kathleen Cholewka, *Xacct Makes It Easier To Bill For IP Service* (http://www.zdnet.com/intweek/daily/981005d.html), Inter@ctive Week, ZDNet, Oct. 5, 1998.

Article, Lucas et al., *Mediation in a Multi-Service IP Network* (http://www.xacct.com/news/art100198.html), XACCT Technologies, Inc., Oct. 1, 1998.

Article, Matt Hamblen, *Middleware enables 'net usage planning* (http://www.xacct.com/news/art092898.html), Computerworld, vol. 32, No. 29, Sep. 28, 1998.

Article, Tim Greene, *XAACT pinpoints IP network usage* (http://www.xacct.com/news/art092198.html), NetworkWorld, vol. 15, No. 38, Sep. 21, 1998.

Article, Margie Semilof, *Charging for IP use gets easier* (http://www.xacct.com/news/art092198b.html), Computer Reseller News, Sep. 21, 1998.

Article, Kate Gerwig, *Creating Meter Readers For The Internet* (http://www.techweb.com/se/directlink.cgi?INW19980921S0042), Internetweek, Issue: 733, Section: Bandwidtth, Sep. 21, 1998, CMP Media Inc.

Article, John Morency, *XaCCT offers multivendor, multi-technology billing model for ISP consumption* (http://www.nwfusion.com/newsletters/nsm/0914nm2.html), Network World Fusion Focus on Network/Systems Management, Network World, Inc., Sep. 16, 1998.

Article, Shira Levine, *XACCT brings flexible billing to the IP world* (http://www.americasnetwork.com/news/9809/980915⁻xacct.html), Advanstar Communications, Sep. 15, 1998.

Telecom Product News, *Accounting and Reporting System for Corporate Network Resource and IS Use* (http://www.xacct.com/news/pressreleases/papers3.html), XACCT Technologies, Inc., Apr. 1998.

Article, *BYTE's Best of Show Award at CeBIT Goes To SuperNova;s Visual Concepts* (http://www.byte.com/special/3cebit98.htm), Byte, Mar. 23, 1998.

Press Release, *XACCT Teams With Kenan to Provide Advanced Solution For Usage-Based Billing of IP Applications* (http://www.xacct.com/news/pressreleases/papers8.html), XACCT Technologies, Inc., Oct. 26, 1998.

Press Release, *Solect and XACCT Partner to Provide IP Usage-based Billing Solution* (http://www.xacct.com/news/pressreleases/papers7.html), XACCT Technologies, Inc., Sep. 28, 1998.

Press Release, *XACCT Supports Cisco's New Web-Based Enterprise Management Suite* (http://www.xacct.com/news/pressreleases/papers6.html), XACCT Technologies, Inc., Sep. 22, 1998.

Press Release, *XACCT Technologies Enables Usage-Based Billing for Internet* (http://www.xacct.com/news/pressreleases/papers4.html), XACCT Technologies, Inc., Sep. 21, 1998.

News Release, *XACCT Technologies Now shipping Accounting and Reporting System for Corporate network Resource and ISP Use* (http://www.xacct.com/news/pressreleases/papers1.html), XACCT Technologies, Inc., Mar. 19, 1998.

News Release, *XACCT Technologies Releases Accounting and Reporting System for ISP and Corporate Network Resource Use* (http://www.xacct.com/news/pressreleases/papers.html), XACCT Technology, Inc., Dec. 10, 1997.

\* cited by examiner

| | | |
|---|---|---|
| / | /input/24b /26b /28b /28d | The input queues are where nodes look for files to process |
| / | /output/24b /26b /28b | The output queues are where nodes write their post-processed files |
| / | /scratch/24b /25b /28b | The scratch queues is used by the node to persist data |

80

```
Log on Node Host <NM on Jeff's PC> @  141.251.69.242                    ─ ▢ ✕
```

Log of Node Host <NM on Jeff's PC> 141.251.69.242

| | |
|---|---|
| Apr 14, 2000 8:03:22 PM | Warning: Error reading Node Table file due to corruption or build version incon |
| Apr 14, 2000 8:03:23 PM | Informational: Node Table at NM startup * |
| Apr 14, 2000 8:03:23 PM | Informational: Data Flow Mapping at NM startup * |
| Apr 14, 2000 8:03:23 PM | Informational: Starting the Local Data Manager... |
| Apr 14, 2000 8:03:23 PM | Informational: Local Data Manager started successfully. |
| Apr 14, 2000 8:03:23 PM | Informational: Starting the Remote Data Manager... |
| Apr 14, 2000 8:03:23 PM | Informational: Remote Data Manager started successfully. |
| Apr 19, 2000 8:43:44 AM | Warning: Error reading Node Table file due to corruption build version incon |
| Apr 19, 2000 8:43:46 AM | Informational: Node Table at NM startup * |
| Apr 19, 2000 8:43:46 AM | Informational: Data Flow Mapping at NM startup * |
| Apr 19, 2000 8:43:48 AM | Informational: Starting the Local Data Manager... |
| Apr 19, 2000 8:43:48 AM | Informational: Local Data Manager started successfully. |
| Apr 19, 2000 8:43:49 AM | Informational: Starting the Remote Data Manager... |
| Apr 19, 2000 8:43:49 AM | Informational: Remote Data Manager started successfully |
| Apr 21, 2000 10:38:18 AM | Informational: Node successfully added: 3 |
| Apr 21, 2000 10:40:14 AM | Informational: Node successfully added: 4 |

Warning: Applet Window

FIG. 13K

| ID | Type | Destination Nodes | Status | State |
|---|---|---|---|---|
| 1 | EI: Radius | 6 | | Running |
| 2 | EI: GGSN | 7 | | Running |
| 3 | EI: V15K | 5 | | Stopped |
| 4 | EI: Netflow | 8 | | Stopped |
| 5 | Enh: Normalizer | 8 | | Stopped |
| 6 | Agg | 9 | | Running |
| 7 | Agg | 10 | | Stopped |
| 8 | Agg | 11 | | Stopped |
| 9 | OI: Oracle | | | Running |
| 10 | OI: Flatfile | | | Running |
| 11 | OI: Flatfile | | | Stopped |

SCALEABLE PROCESSING OF NETWORK ACCOUNTING DATA

BACKGROUND

This invention relates to systems that collect information from computer networks.

Data collection systems are used to collect information from network traffic flow on a network.

These data collection systems are design to capture network traffic from sources of the network traffic and deliver the data to a consuming application type such as a billing application.

SUMMARY

According to an aspect of the present invention, a data processing domain includes a node manager that administers nodes and provides a run time environment for administered nodes, a node object to provide specific functional processing and a data manager that provides inter-node data communications for remote nodes or local nodes.

According to a further aspect of the invention, a computer program product residing on a computer readable medium for producing a data collection and processing node on a computer device includes instructions for causing a computer to instantiate a data processing domain that includes a node manager that administers nodes and provides a run time environment for administered nodes, a node object to provide specific functional processing and a data manager that provides inter-node data communications for remote nodes or local nodes.

According to a still further aspect of the invention, a data collection system includes a plurality of interconnected node host computers. The computers have a node manager resident the node host computers. The node manager contains at least one processing node and a data manager. The data manager delivers network records between a first processing node and second processing node.

According to an additional aspect of the invention, a data collection system includes a plurality of interconnected host computers arranged to receive network data from a network with at least some of said plurality of interconnected node host computers including a plurality of processing nodes to process the network data. The plurality of processing nodes are arranged in at least one logical chain of processing nodes where at least some of the processing nodes on the chain perform different processing tasks on the network data.

One or more aspects of the invention may include one or more of the following advantages.

The invention allows easy configuration of system processing nodes and distribution of processing nodes across host systems. The nodes are configured to perform specific or discrete processing tasks and are linked together in the chains. This arrangement provides processing that is scalable, programmable and distributed. The assignment of nodes to host computers is generally arbitrary. The nodes can be placed any number of host computers. The chaining of the nodes provides a data flow architecture in which input data/records are fed to the first node in the chain and the output records/data from the nodes are received from the last node of the chain. The data that is processed by each node is processed in an order in which nodes are arranged in the chain. The chain can be split into two or more chains or converge to fewer chains to accomplish different processing tasks or loads. This approach allows large volumes of related network data that may be transient in terms of space and time to be received from disparate sources and processed in a timely and optimal fashion through parallel computation on multiple network computers to provide scalability.

BRIEF DESCRIPTION OF THE DRAWINGS

FIGS. 13A–13K are screen shots depicting aspects of an administrative client graphical user interface.

FIG. 14 is a diagram depicting an administration system view.

DESCRIPTION

Figure 1:
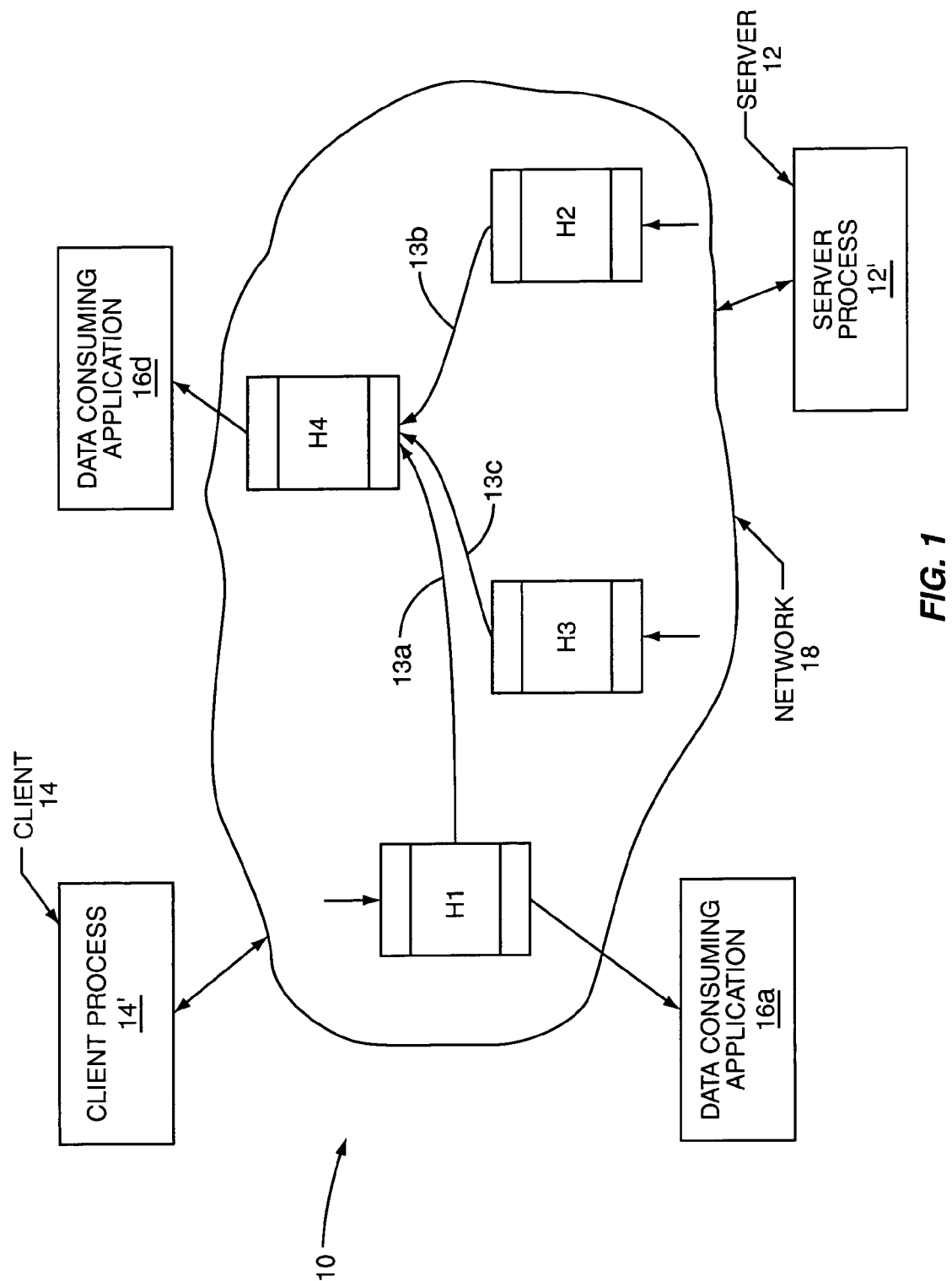
FIG. 1 is a block diagram of a network system including distributed data collection/processing system.

Referring to FIG. 1, an implementation of a distributed data collection system 10 is shown. The distributed data collection system 10 can be used to obtain network information for an accounting process or, alternatively, can be used for other data collection activity such as providing data to user-defined data consuming applications such as billing, performance reporting, service level management, capacity planning, trending, and so forth. Herein the system will be described with respect to an accounting process 20 (FIG. 2) although other implementations, of course, can be used.

The data collection system 10 includes a plurality of host computers H1–H4 dispersed across a network 18 such as the Internet. The host computers H1–H4 can be any computing device that includes a central processing unit or equivalent. The host computers H1–H4 are disposed in the network 18 in order to capture network data flowing through the network. The host computers H1–H4 include configurable nodes, as will be described, which are arranged to process the network data in a distributed manner. The host computers H1–H4 transfer records between each other via virtual paths 13a–13c using a network protocol. Thus, if the network is the Internet the TCP/IP protocol is used. As shown in FIG. 1, the system also includes a server computer 12 that runs a server process 12' used to configure nodes on the host computers H1–H4 in order to provide the desired data collection activity. The data collection system 10 also includes a client system 14 operating a client process 14' that interfaces with the server process 12' in order to accomplish the aforementioned configuration functions. As also shown, host systems H1 and H4 include interfaces (not numbered) that couple to user defined applications 16a, 16d such as billing, performance reporting, service level management, capacity planning, trending, and so forth.

In addition, host systems H1, H2 and H3 also include equipment interfaces (not numbered) that obtain data from the network 18. The network devices (not shown) can produce data of various types and formats that are handled in the data collection system 10. Examples of data types include "Remote Authentication Dial-In User Service" records (RADIUS). Other information sources can include network traffic flow, RMON/RMON2 data, SNMP-based data, and other sources of network usage data. The host computers H1–H4 are configured and arranged in a manner to perform the specified function such as the network accounting function mentioned above. They can be geographically dispersed throughout the network but are logically coupled together in order to perform the requested task.

Figure 2:
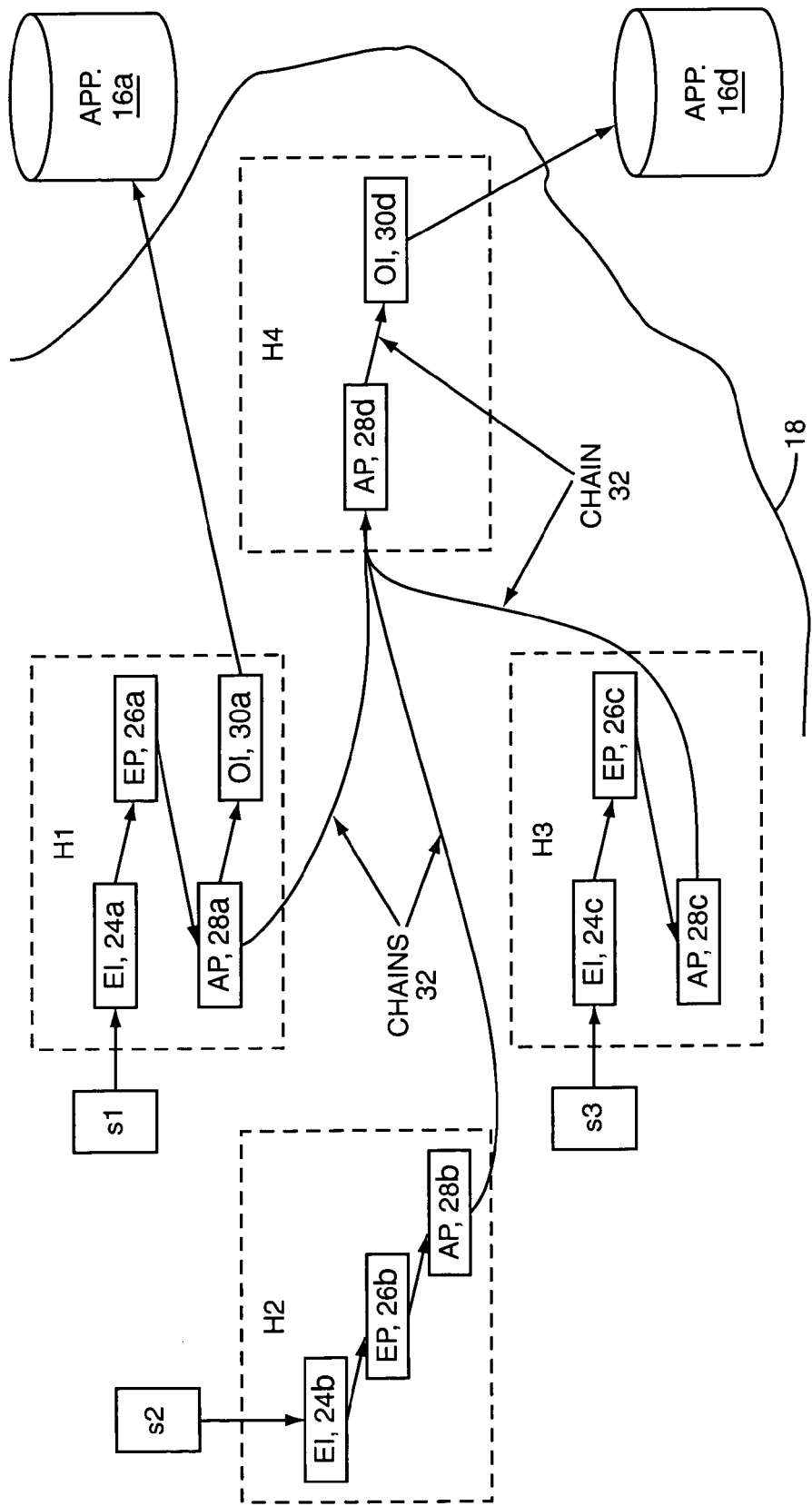
FIG. 2 is a block diagram depicting a logical view of a network accounting implementation using the distributed data collection/processing system of FIG. 1.

Referring now to FIG. 2, a logical view of the arrangement of FIG. 1 configured as an accounting process 20 is shown. Here the host computers H1–H4 each have a plurality of nodes, e.g., nodes 24a–24c on hosts H1–H3 respectively, nodes 26a–26c on hosts H1–H3 respectively, nodes 28a–28d on hosts H1–H4 respectively, and nodes 30a and 30d on nodes H1 and H4 only. The nodes within the host computers H1–H4 are arranged to provide chains 32 to provide the accounting process 20. Nodes 24a–24c are equipment interface nodes that will be described below which are used to obtain network data from network devices s1–s3 disposed within the network. The network devices s1–s3 can be switches, routers, remote access concentrators, probes, flow probes, directory naming services and so forth. Nodes 30a and 30d are output interfaces as also will be described below which are used to interface the network accounting process 20 to the network consuming applications 16a and 16b.

The nodes are configured to perform specific or discrete processing tasks and are linked together in the chains 32 as will be described below. This arrangement provides processing that is scalable, programmable and distributed. The assignment of nodes to host computers is generally arbitrary. That is, the nodes can be placed on any one of the host computers H1–H4, on fewer host computers or more host computers. The chaining of the nodes provides a data flow architecture in which input data/records are fed to the first node in the chain and the output records/data from the nodes are received from the last node of the chain. The data that is processed by each node is processed in an order in which nodes are arranged in the chain. The chain may be split into two or more chains or converge to fewer chains to accomplish different processing tasks or loads. This approach allows large volumes of related network data that may be transient in terms of space and time to be received from disparate sources and processed in a timely and optimal fashion through parallel computation on multiple network computers to provide scalability.

Figure 3:
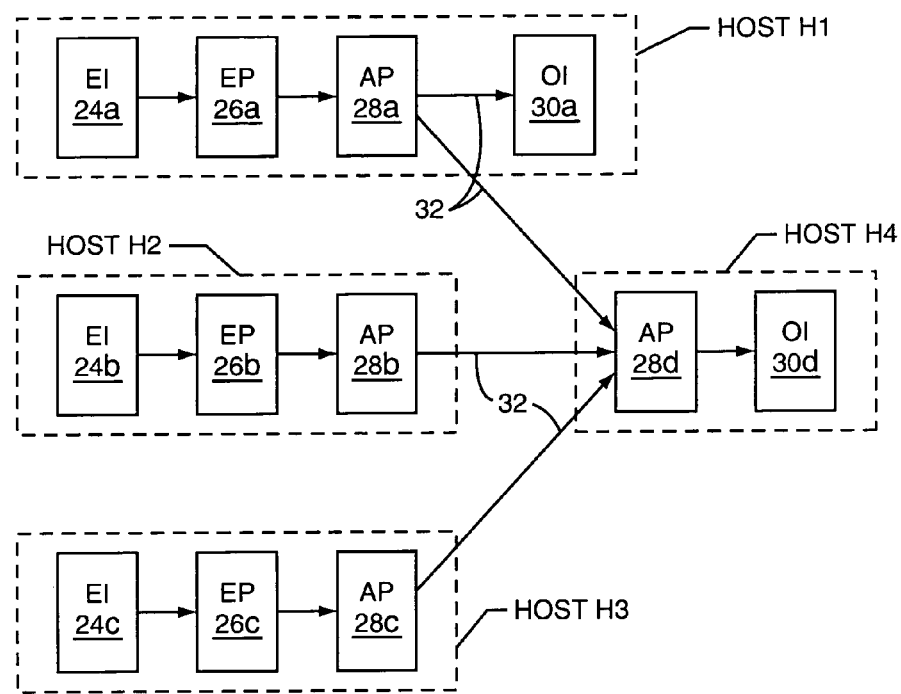
FIG. 3 is a block diagram depicting a physical view of the network accounting implementation showing an arrangement of nodes distributed in chains across host systems.

Referring to FIG. 3, a physical view of the implementation of the accounting process 20 is shown. The accounting process 20 has a plurality of processing nodes arranged in the chains 32. Each node in each of the chains 32 performs a specific task in the accounting process 20. The output of one node, e.g., node 26a, is directed to the input of a succeeding node, e.g., node 28a. For some nodes such as node 28a the output is directed to several succeeding nodes e.g., nodes 30a and 28d. Data flows between nodes until the data is removed from the accounting process 20 by being captured by an application 16a, 16b (FIGS. 1, 2). If any node in a chain 32 fails and stops processing, network records for that node will stack up in the node's input queue (not shown) so that the data is generally not lost.

Node types that may be included in an accounting process 20 include an Equipment Interface (EI) type such as nodes 24a–24c that collect data from a source outside the accounting process 10. In one embodiment the EI node translates data into network records, such as, network accounting records (NARS) Network accounting records NARS are normalized network records. Since the accounting process 20 collects data from multiple types of network equipment, the EI node translates and normalizes these different types of records into a NAR. The NAR can be processed by any other node in the accounting process 20. There are several different specific EIs, one for each type of information source (i.e., RADIUS EI, GGSN EI, etc.)

The accounting process 20 also includes an enhancement processor node type (EP) e.g., nodes 26a–26c, which can perform several different processing tasks. The enhancement node may add attributes to a NAR based on the value of an existing attribute in the NAR. In addition, an enhancement node may perform filtering, data normalization, or other functions. The accounting process 20 also includes an aggregation processor node type (AP) e.g., nodes 28a–28d that aggregate a series of NARS into one NAR by correlating or as appropriate combining specific attributes and accumulating metrics over time. The system also includes an output interface node type (OI) e.g., nodes 30a and 30d that translates NARS to an external data format and delivers the data to a data consuming application. Additional details on the node processing types will be described below.

In FIG. 3, the nodes are arranged in chains 32 distributed over four host computers (H1–H4). Two of these computers (H2 and H3) each have an EI node 24b, 28c, an EP node 26b, 26c, and an AP node 28b, 28c. Computer H1 has an EI node 24a, EP node 26a, AP node 28a, and an OI node 30a. The fourth computer (H4) has an AP node 28d and an OI node 30d. The accounting system 20 can have many processing nodes that may be distributed across many host machines.

An Administrative graphical user interface GUI, as described below is used to set up the chains of nodes that are responsible for processing NARS in a particular order. This chaining approach can increase throughput of records in an accounting process by distributing the work of a single node across multiple processors. Chaining can also help in load balancing and providing flexibility and distributed functionality to the accounting process 20.

Figure 4:
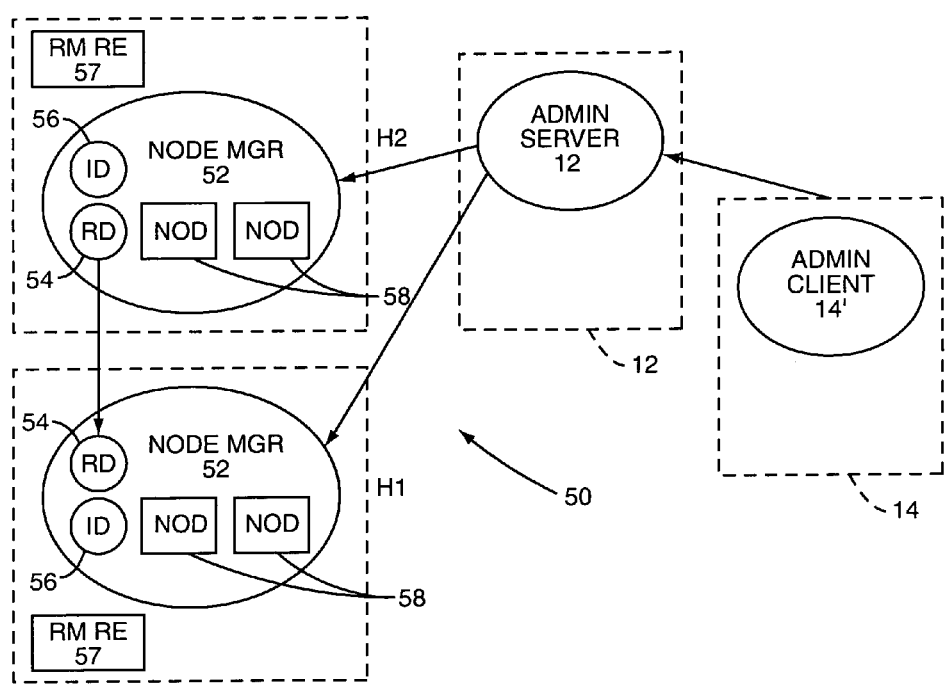
FIG. 4 is a block diagram of a data processing domain in the data collection/processing system of FIG.

Referring to FIG. 4, a data processing domain 50 for nodes in the data collection system 10 such as the accounting process 20 includes run-time components. The run-time components include an administration Server (AS) 12' executing on the server 12 (FIG. 1) that provides communications between an Administration Client 14' executing on the client system 14 (FIG. 1) and Node Managers 52. A node manager 52 resides on each machine or host H1–H4 in the accounting process. The Admin Client (AC) 14' is a browser applet or application that allows a user to administer the accounting process 20 by supplying configuration information to the node managers 52. The Node Manager 52 provides a Remote Method Invocation (RMI) registry 57 on a well-known port, e.g., a port that is specified and registers itself in the RMI registry 57.

The Node Managers (NM) 52 manage nodes generally 58 e.g., nodes 24a–24c, 26a–26c, 28a–28d and 30a, 30d (FIGS. 2 and 3) that perform processing on data, records, and so forth. The accounting process 20 1Q also includes a Local Data Manager (LDM) 56 that moves data i.e., network records such as NARS, between local nodes (i.e., nodes on the same host system), and Remote Data Manager (RDM) 54 that moves data between remote nodes (i.e., nodes on different host systems). In the accounting process 20, the accounting data or records are contained in queues. The data could also be contained in a file structure or other arrangements.

Figure 5:
FIG. 5 is a chart showing queue assignments used for data flow management.

Referring to FIG. 5, an exemplary queue assignment 80 used for Data Flow on host H2 in FIG. 3 is shown. For the arrangement in FIG. 3, aggregation node 28d has an input queue on host H1 (FIG. 3), since it receives data from node 28a, which exists on host H1 (FIG. 3). Node 28d also has input queues on hosts H2 and H3 as well. Node 28d has input, output, and temporary queues on host H4 (FIG. 3).

Figure 5A:
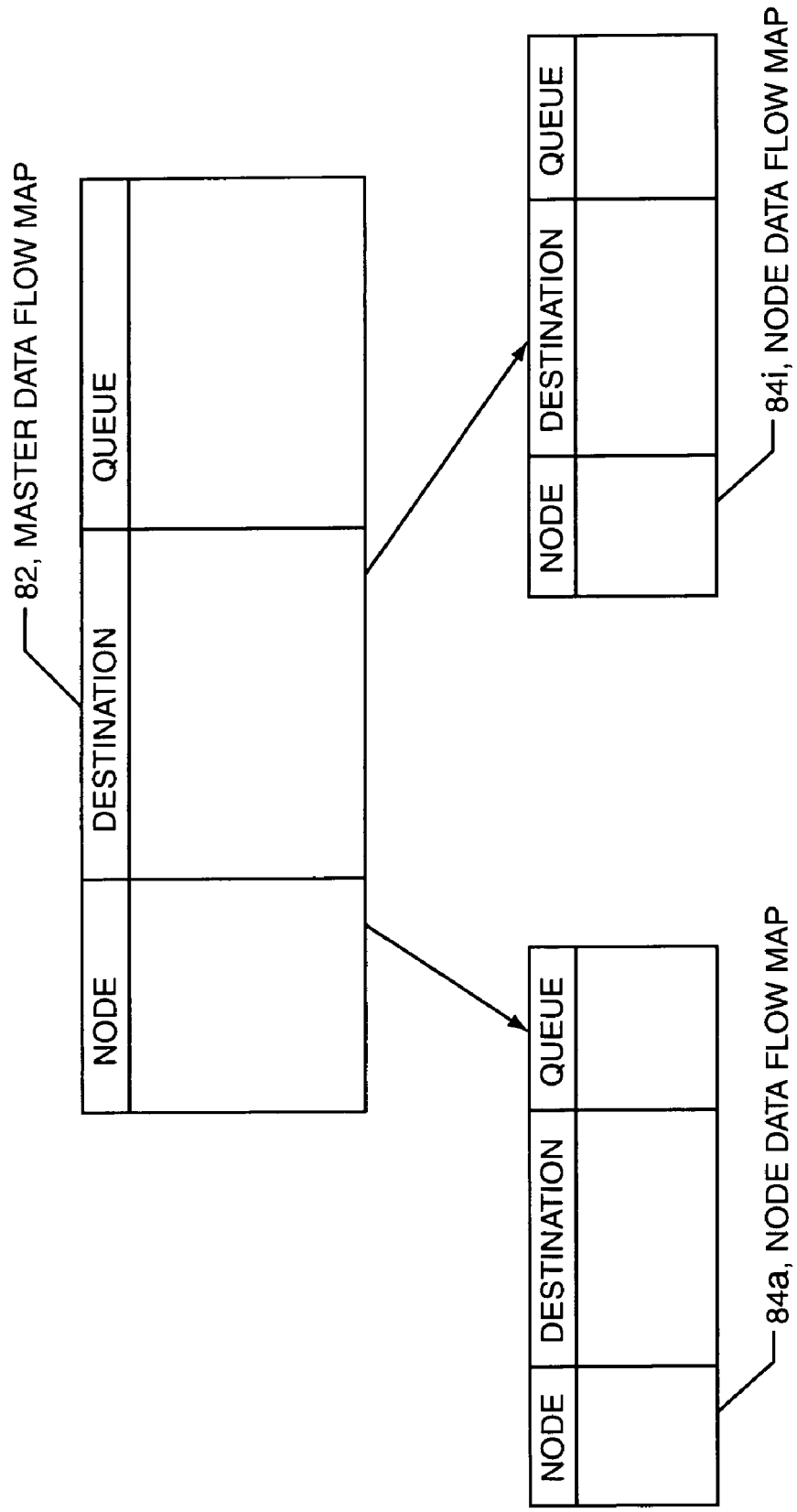
FIG. 5A is a block diagram showing data flow management maps.

Referring to FIG. 5A, data in an accounting process 20 flows through the system 10 according to a Data Flow Map. The Admin Server 12 maintains a master Data Flow Map 82 for the entire accounting process 20. Each Node Manager maintains a subset of the master map 84a–84i that maps only the portion of the node chain on the Node Manager's host. The data flow map is a data structure that lists all nodes that send data to other nodes to represent the flow of data. The Data Flow Map specifies, for each node, what nodes should receive output NARS from the node. Each node on a host has an input queue, and output queue, and a temporary queue on that host. Further, if a remote node does not exist on a particular host, but receives output from a node that does exist on the particular host, then the remote node has only an input queue on that host.

The node makes a decision as to which of downstream nodes a particular NAR will be delivered. That decision determines the input queue that the NAR is written to. Data managers 56 or 58 are responsible for moving data between nodes. The data manager 54 or 56 periodically (which is also configurable), looks to see what data is in output queues. When the data manager finds NARS the data manager moves the NARS to the appropriate input queue of a succeeding node. While this embodiment uses local and remote data managers, a single data manager that handles both local and remote transfers can be used.

Other distribution methods, as described below, in conjunction with FIG. 11, can be used. Thus, instead of nodes having a single output queues, nodes can have multiple queues. Multiple output queues provide the ability to split the NAR stream up into portions that can be delivered to different downstream nodes based upon selectable criteria.

Figure 6:
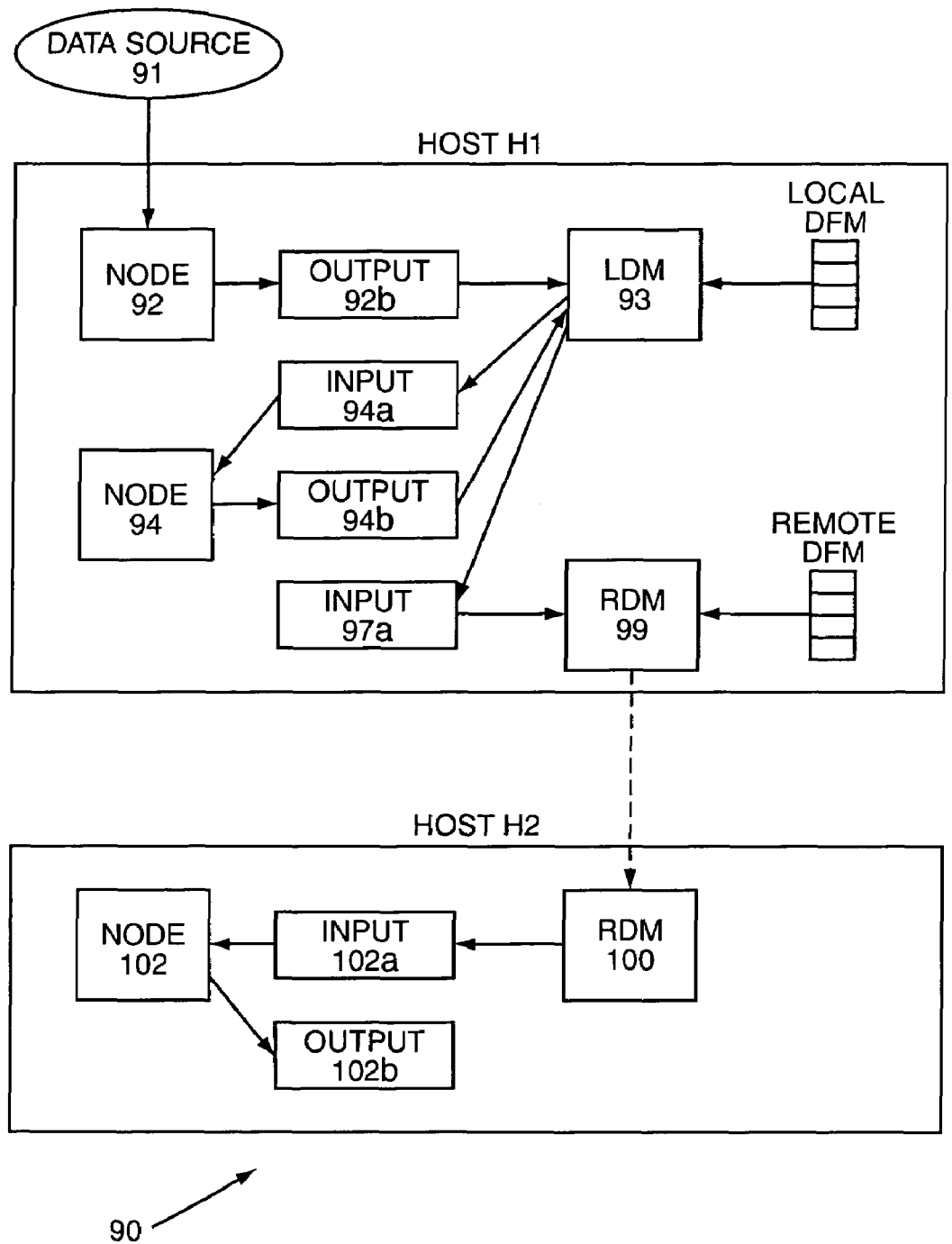
FIG. 6 is a block diagram of data flow management in the system of FIG. 1.

Referring to FIG. 6, a data flow example 90 in accounting process 20 is shown. The arrows indicate the directions that NARS are transferred. Data are received from a data source 91 at Node 92, an EI node. The EI node 92 converts the data to NARS, and writes the NARS to its output queue 92b. The LDM 93 moves the NARS from output queue 92b to an input queue 94a of node 94, in accordance with the Data Flow Map (DFM) for that LDM 93. Node 94 reads from its input queue 94a and writes to its output queue 94b. The LDM 93 moves the NARS from the output queue 94b to an input queue 97a. The RDM 99 reads the NARS from input queue 97a, connects with the RDM 100 on host H2, and sends the NARS to the RDM 100. The RDM 100 on host H2 receives the NARS, and writes them into input queue 102a. Node 102 on host H2 reads from its input queue 102a processes the NARS and writes NARS to output queue 102b.

Nodes generally get input NARS from an input queue, and write output NARS to an output queue. The exceptions are EIs, which get input data from outside the accounting process 20, and OIs, which output data to data consuming applications that are of outside the accounting process 20.

Figure 6A:
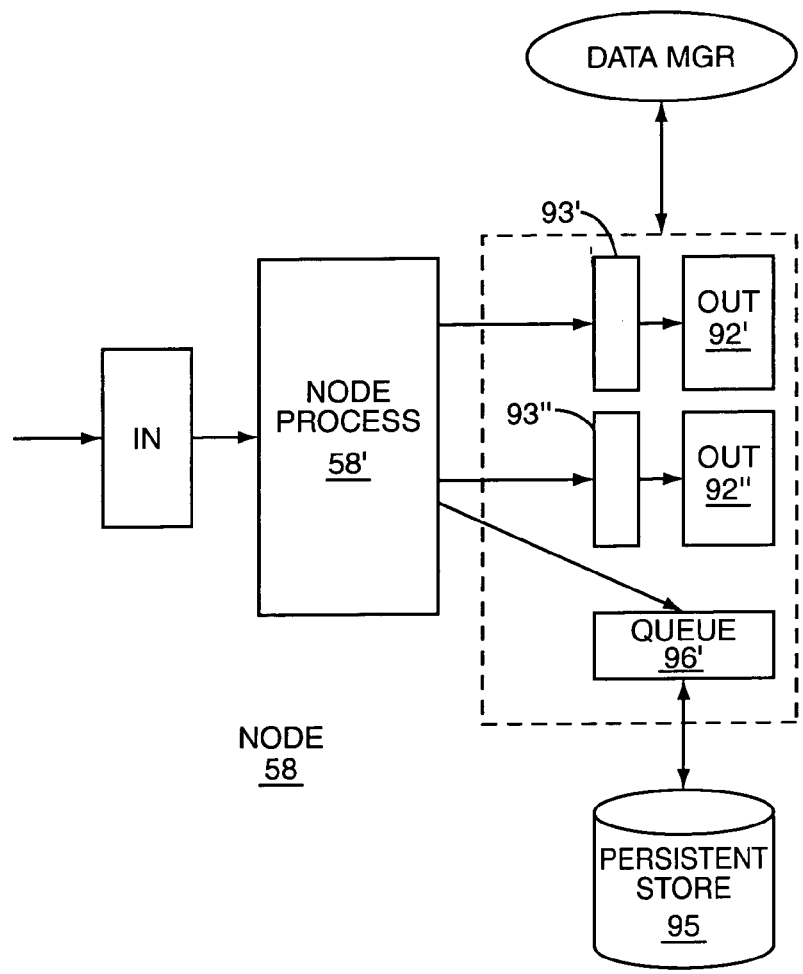
FIG. 6A is a block diagram showing queue structures.

Referring to FIG. 6A, generally a processing node 58 has a functional process 58' (e.g., enhancing, aggregating, equipment interface or output interface, and others) and can use temporary queues 93'–93" to keep a NAR "cache." NAR cache can be used to hold output NARS, until the NARS are ready to be moved to the node output queue 92', 92". Once a node's current output cache grows to a configured size, the output file is placed in the output queue. Also, if the cache file has existed longer than a configured amount of time, the data manager node will move it to the output queue regardless of it's size. The data manager can be a LDM or a RDM. This will ensure that data continues to flow through the system in times of very low traffic. A queue 96' can also be provided to hold NARS to persist to storage 95.

Figure 6B:
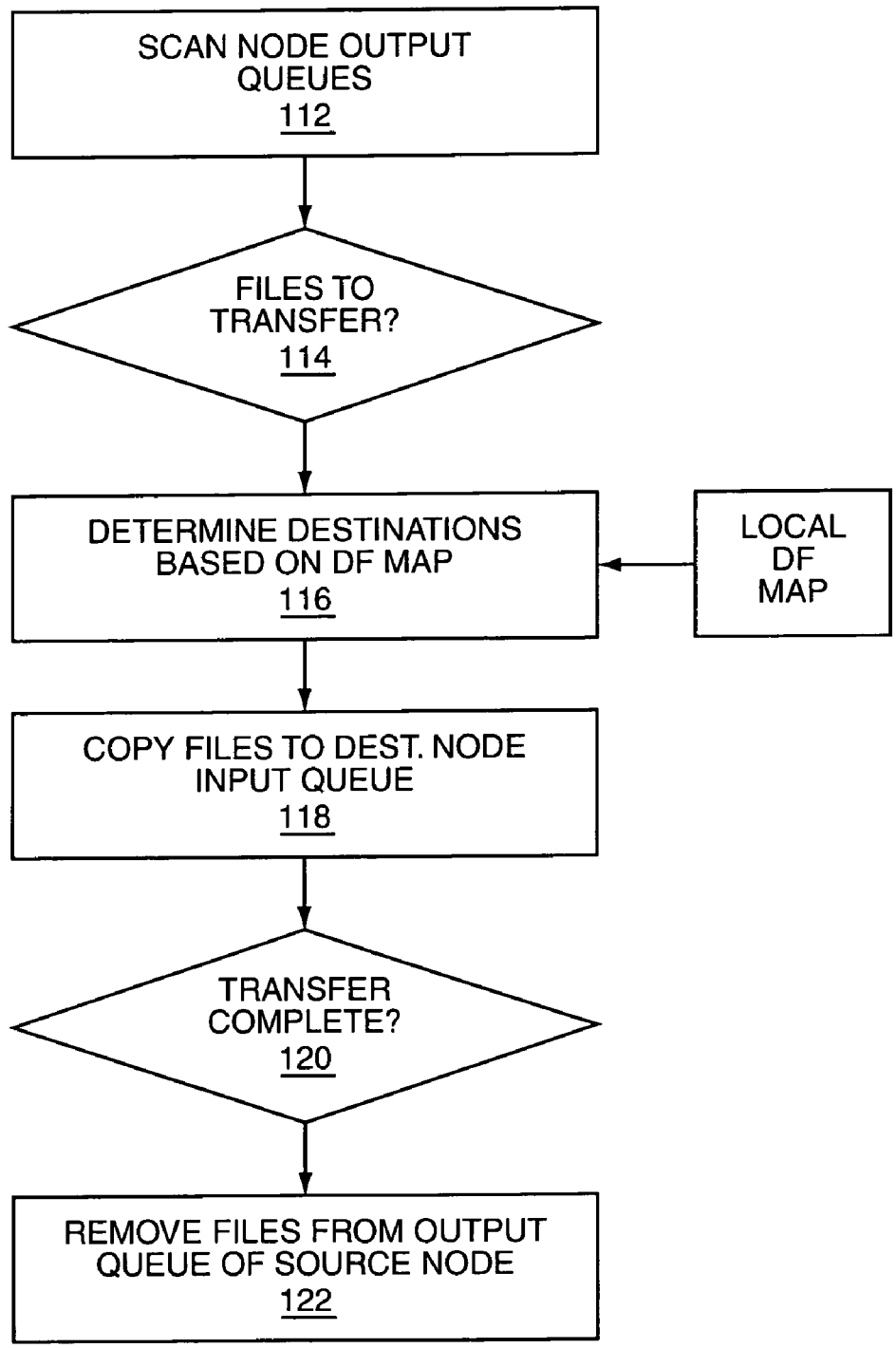
FIG. 6B is a flow chart showing record transfer under the data flow management process.

Referring to FIG. 6B, the Local Data Manager LDM 93 distributes the NARS from each node's output queue to the destination node's input queues. There is one LDM 93 running on each node host in an accounting process 20. The LDM 93 periodically scans 112 node output queues, and determines 114 if there are NARS to transfer. If there are NARS to transfer the LDM determines 116 destinations based upon the local data flow mapping, and copies 118 NARS in the output queue to the destination node(s') input queue(s). Once the file is successfully distributed 120, the LDM removes 122 the file(s) from the output queue. In FIG. 6, on host H1, the LDM 93 would copy NARS from output 92b to input 94a, and from output 94b to input 97a. Even though node 102 is remote to host H1, node 102 still has an input queue on host H1 because node 102 receives input from a node on host H1.

The Remote Data Manager (RDM) 99 delivers NARS destined for nodes on remote hosts in generally the same manner as shown in FIG. 6B for the LDM. There is one RDM 99 running one each node host computer in an accounting process 20. The RDM periodically scans the input queues of remote nodes for NARS, transferring NARS by connecting to the RDM 100 on the destination machine and once a NAR has been successfully delivered, removing the NAR from the input queue. The accounting process 20 can also be configured to maintain NAR files after processing for backup and restore purposes. The RDM 100 also receives NARS from remote RDMs, and places them in the destination node's input queue. In FIG. 6, on node host H1, the RDM 99 would periodically check input queue 97a for NARS. Once found, it would open a connection to host H2, send the file, and remove the file from input 97a. The RDM 100 on host H2 would place the file in input queue 102a on host H2

A functional Node 58 can be an EI, aggregator, enhancer, and OI, as mentioned above. The components have a set of common functionality including the input and output of NARS, and administrative functions. All nodes are derived from a base node class, or some intermediate class that derives from the base node class. This set of classes provides common functionality to be offered by all nodes. The base node provides functionality to derived nodes to monitor the input queue for incoming NARS, read the NARS in and make the NARS available for processing. The base node enables writing of the processed NARS to a file in the output queue. All nodes require initialization of objects necessary for error logging, node configuration, and other common processing such as, control of threads required for processing of NARS for those nodes whose input data comes the nodes' input queue.

Figure 7:
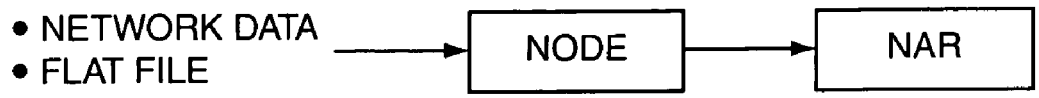
FIGS. 7–9 are block diagrams of various node types showing input and output data types.
Figure 8:
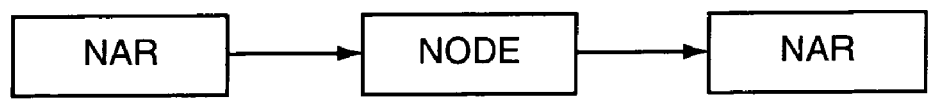
Figure 9:
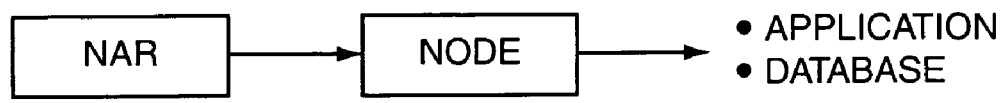

Referring to FIGS. 7–9, there are four different kinds of functional nodes EI, EP, AP, and OI that fall into three general categories. As shown in FIG. 7, an EI node does not receive its input data as NARS in an input queue. Instead, it receives raw data from the network, a flat file, or database. The output for an EI node will be network records e.g., NARS. The base node has utilities to store NARS. As shown in FIG. 8, aggregator and enhancement nodes receive data from the node's input queue and store resultant NARS in the node's output queue. As shown in FIG. 9, OI nodes receive data from the node's input queue. However, data produced from the NARS is stored in places. NARS processed by OI Nodes may be formatted and stored in a database or flat file, or any other data source provided to the system or they may be sent out as network messages to some non-target device.

Figure 10:
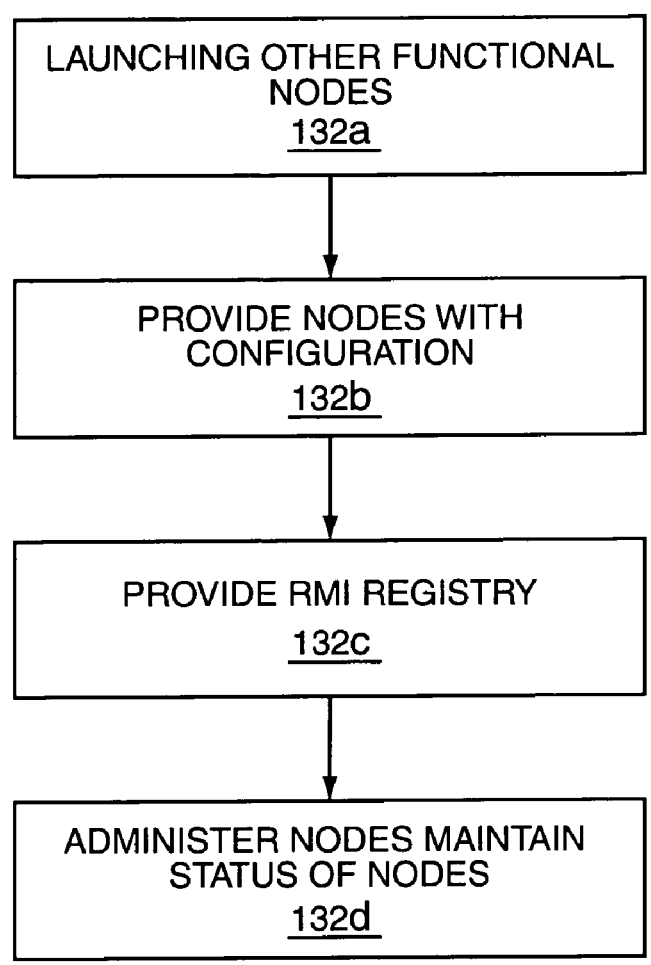
FIG. 10 is a flow chart showing node manager processing.

Referring to FIG. 10, processing by the Node Manager (NM) 52 (FIG. 4) that is included on each host that participates in an accounting process is shown. The Node Manager 52 is run at boot up time, and is responsible for launching 132a other functional processes (Nodes, LDM, RDM). During node initialization, the Node Manager 52 provides 132b nodes with all queue and configuration information that nodes require to run. Since a node exists as an object within the Node Manager 52, the NM 52 issues commands to the node as needed. The set of commands the Node Manager 52 may issue is defined in an interface that all nodes implement. It is also responsible for providing necessary data to the other components. All nodes, and the LDM/RDM exist in memory as objects maintained by the Node Manager.

The Node Manager 52 on each Accounting process provides 132c a Remote Method Invocation (RMI) registry 57 on a well-known port, e.g., a port that is specified and registers itself in the RMI registry 57. When produced by the Node Manager, an RDM 52 will also register itself in the registry 57 as part of its initialization processing. The node manager maintains the RMI registry 57 for the other processes, e.g., RDM, Admin Server, and acts as an entry point for all admin communications on its system.

The node manager 52 interfaces 132d with the Admin Server 12 and is responsible for adding, deleting, starting, stopping, and configure nodes, as requested by the Admin Server 12. The Node Manager 52 also maintains current status of all nodes and transfers that information to the Admin Server and maintains configuration information for components. The Admin Server communicates to the NM 52 by looking for the NM's registry 57 on the well-known port, and getting the reference to the NM 52 through the registry 57. The RDM 52 exists as a remote object contained within the Node Manager and registers itself in the registry 57 so that RDMs 52 on other node hosts can communicate with it via RMI 57.

As part of the initialization, the Node Manager 52 has two configuration files that are read in upon start up. The data flow map file indicates where the output of each node on the NM's computer should be directed. The output of some nodes on a given host may be directed to target nodes that are remote to the host. This file also contains the hostname or IP address of the host where the remote node is located. The node list file contains information about which nodes should be running on the NM's host, including the nodes' types, id numbers, and configured state (running, stopped, etc.) The NM 52 monitors all of the nodes, as well as the LDM and RDM. It receives events fired from each of these objects and propagates the events to the Admin Server. In addition, the node manager logs status received from the LDM/RDM and nodes.

As part of the NM administration 132d, the node manager administers changes to the data flow map and the node table. If either file is changed, the NM will cause the LDM, or RDM (depending on which file is changed) to reconfigure. The NM will write the node configuration file when a node is produced or node configuration is edited. If the node is running at the time, the NM will notify the node to reconfigure. The LDM moves the data from the output queues of producer nodes to the input queues of each node's consumers. When initialized, the LDM reads the local data flow map file and builds a data structure representing the nodes and destinations. The node manager periodically scans each source node's output queue. If the node manager discovers NARS in a node's output queue, the node manager copies the NARS to the input queues of the nodes that are destinations to that source node. Once the NAR has been fully distributed, the copy in the source node's output queue will be removed (deleted). If the LDM was unable to copy the NAR to all of it's destinations input queues, it will not remove the NAR but will keep attempting to send the NAR until it has been successfully transferred, at which time it will remove the file from the queue. The LDM reads only one "configuration" file at start up, the local data flow map file. This file contains a list of all of the nodes that the LDM services and the destinations of all of the nodes.

For nodes that reside on a remote host, a 'local' input queue is produced. NARS are copied to this local input queue as for local destination nodes. The RDM is responsible for moving NARS in these local input queues to the input queues of nodes on remote hosts. The RDM scans the input queues of nodes that are remote to the host the RDM is running on. If the RDM finds NARS, it connects to the RDM on the remote host that the destination node is on, transfers the NARS, and deletes the NARS.

Upon execution, the RDM registers in an RMI registry running on its local machine, on a well-known port. After registering itself in the RMI registry, the RDM reads in its remote data flow map file, which is maintained by the Node Manager. Based upon the mapping in the file, the RDM scans each remote node's local input queue. If it discovers NARS in an input queue, it connects to the RDM on the host that the remote destination node lives on, transfers the NARS, and then deletes the NARS. Once the NAR file has been fully distributed to all mapped remote nodes, the copy in the node's local input queue will be removed (deleted). If the RDM was unable to transfer the file to all of it's destination RDMs, it will not remove it. When an RDM is receiving a file, it first writes the data to a temporary file in its temporary area. After the file has been fully received and written, the RDM renames (moves) the file to the appropriate node's input area. This is to prevent a possible race condition that could occur if the node tries to read the file before the RDM is finished writing it to the input queue. The RDM reads only one "configuration" file at start up, the remote data flow mapping file. This file contains a list of all of the remote nodes that the RDM services, including their host IP addresses and RMI registry ports. The Node Manager List contains an entry for each node manager in the system. Each entry contains an IP address of the host that the NM's is on, it's RMI registry port, and it's name. The node list is a file that contains information on each node in the system.

Figure 11:
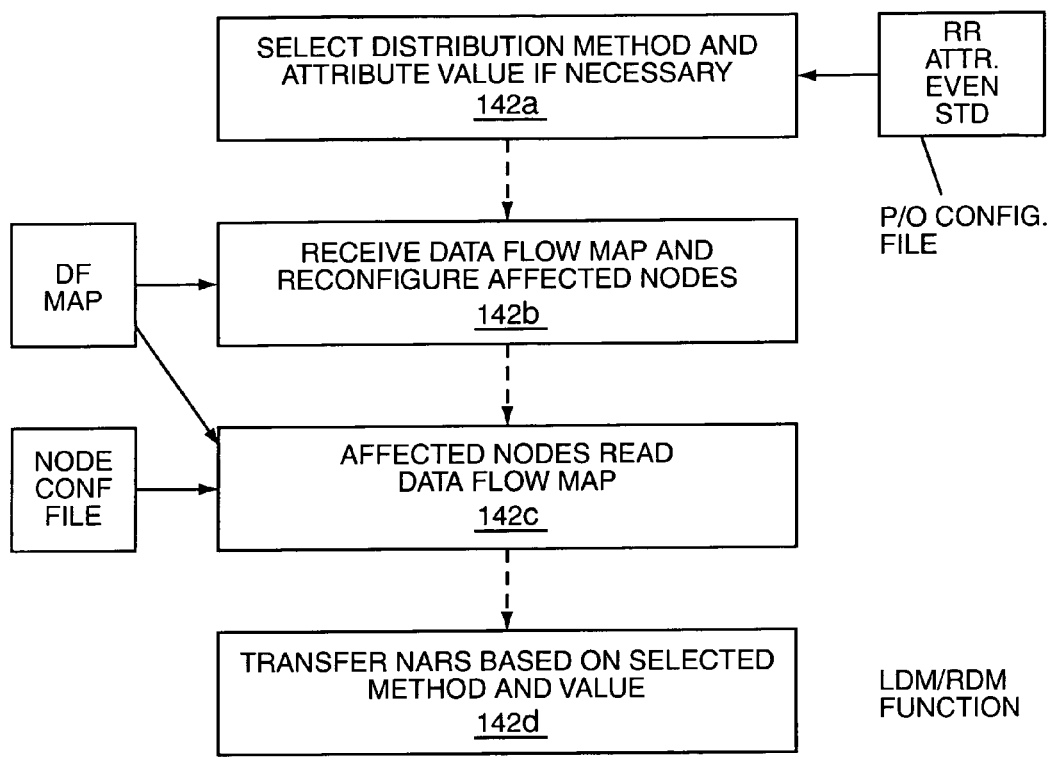
FIG. 11 is a flow chart showing a node manager process for NAR routing based transfers.

Referring to FIG. 11, there are other cases where processing does not need multiple NARS. For example, an enhancement node adds attributes into a single NAR as opposed to combining multiple NARS into one. In that case, the process can be configured to send NARS to different enhancer nodes. For aggregation processing a node can be configured to send all NARS to a specific node, to all nodes, or can be configured to divide the stream in an intelligent way to accomplish some specific task. The stream can be divided based upon some attribute e.g., "IP Address originating transaction" that correlates a group of NARS that can be aggregated together, or a selected delivery method. The different algorithms used for the NAR routing decision processing are user configurable.

The user selects 142a a NAR routing algorithm (round robin, attribute, equal, none) through a GUI described below. The graphical user interface allows node configuration such as NAR routing information to be added to a data flow map that is sent to all node hosts. The node host receives 142b the data flow map and distributes the map to all affected nodes to reconfigure those nodes. A node reads 142c configuration and data flow map when initialized. All nodes contain a data management object LDM or RDM that handles reading and writing of NARS in the node's input and output queues. In order to maintain data integrity, a file-based process is used to transport 142d NARS between nodes. With NAR routing, a separate queue is provided for each destination node to which a portion of the data stream will be routed. The file management object determines which queue to place a NAR, using one of a plurality of methods e.g., standard (as described above), round robin, evenly distributed, or selected content of NAR attribute, e.g., an explicit value-based criterion.

As previously mentioned, each queue e is periodically (on a configurable timer duration) copied to the input queue of its corresponding destination node. However, the NARS that each destination receives are typically mutually exclusive of NARS received by other destinations. The node managers 52 can be configured for the NAR routing of all NARS to other destinations as well as copying all NARS to each destination node that is configured to receive all NARS. This functionality can be added to base classes from which all application node classes are derived, enabling all nodes to inherit the ability to split a data stream into multiple paths or streams.

Use of the NAR routing processing depends on the node configuration. Node configuration files include configuration elements such as the number of queue to which the currently configured node will send data and a NAR routing function. The NAR routing function determines the queue to which the data will be sent. This NAR routing approach enables transfers of NAR records according to certain attributes that may be necessary for NAR attribute correlation, aggregation, sequencing, and duplicate elimination. In addition, NAR routing increases throughput of records in an accounting process by distributing NARS to nodes based on where work is most efficiently performed.

The option can include an even distribution of NARS sent to all queue assuming a NAR attribute, e.g., session id, is not skewed. A round-robin option results in NARS being written to each of the queue in turn. This results in an even NAR distribution in the queue. This option does not use a NAR key attribute to determine which queue to write to. Another option is the "equals" option that allows the NAR routing of NARS based on a value of the NAR key attribute. As an example the process 10 can look at one attribute inside a NAR and use that attribute to determine which downstream node to send the NAR to so that a configuration is developed that insures that a downstream aggregator node receives every NAR that is appropriate. For this option channel values are defined in the node configuration file. The number of entries in the channel value list matches the number of channels. The NAR is written to the queue associated with the channel, as defined in the list of channel value list. The NAR key attribute used for NAR routing is added as an entry in a rules file for the particular node being configured to send NARS to different channels.

The architecture allows parallel processing of NARS rather than having a group of NARS channeled to one destination node. This architecture permits NARS to be channeled to multiple nodes in a manner that reduces the load to any of multiple destinations. As mentioned, NAR routing can be based on several considerations. The exact configuration is application dependent. The configuration can depend on the nature of the downstream processing. If downstream processing needs multiple NARS to enhance or correlate together, then the configuration would take that into consideration.

Figure 12:
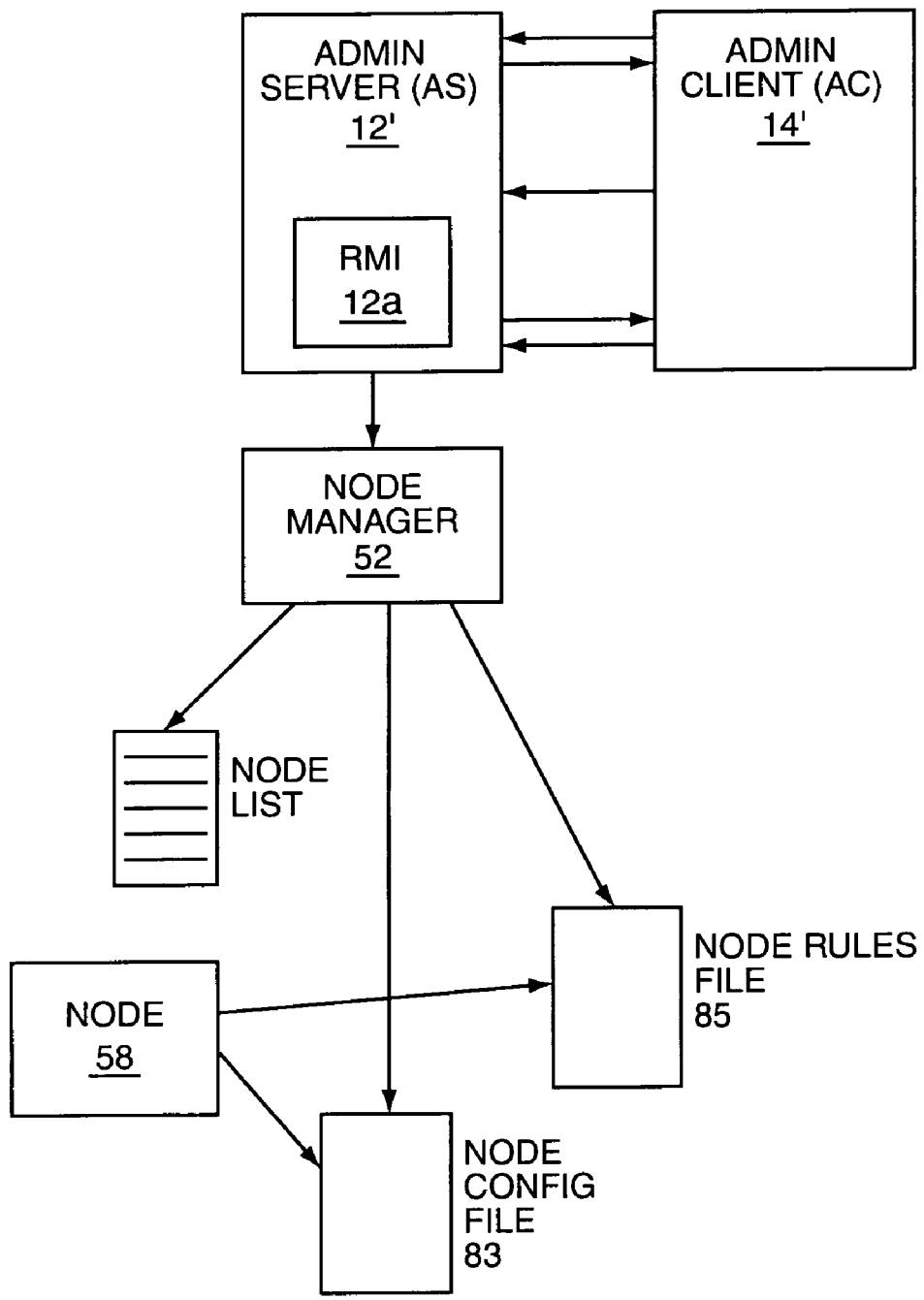
FIG. 12 is a block diagram depicting a node administration process.

Referring to FIG. 12, administration of the system 10 using the accounting process 20 as an example is provided by issuing commands from the Admin client 14 to the Admin Server 12, which in turn communicates to the necessary Node Managers 52. An Admin GUI displayed on the Admin Client 14 allows the user to add/remove node hosts, add/remove nodes, view/edit node configurations, process control (start and stop nodes), as well as, view/edit Data Flow Map, Node Location Table, and View node and Node Manager logs. All nodes 58 have a general configuration file 83. Additional configuration elements will vary according to the type of node. The contents will have a key, value format. All nodes also have a 'rules' file 85 that determines 0.5 how a node 58 performs work. For EI nodes, the rules file defines a mapping for how fields in input records are mapped to attributes in NARS produced by the EI. For OIs, the rules file may define how attributes in NARS are mapped to fields in a flat file or columns in a database. Rules files for Aggregation and Enhancement nodes might define the key attributes in a NAR and other attributes that would be aggregated or enhanced.

Some types of nodes can have secondary configuration files as well. For instance, a Radius EI node can have an "IP Secrets" file (not shown). The locations of these secondary configuration files will be specified in the general configuration file. When running in an accounting process, when a node is added, the node's general configuration file 83 is written to the node's configuration area by the Node Manager.

Figure 12A:
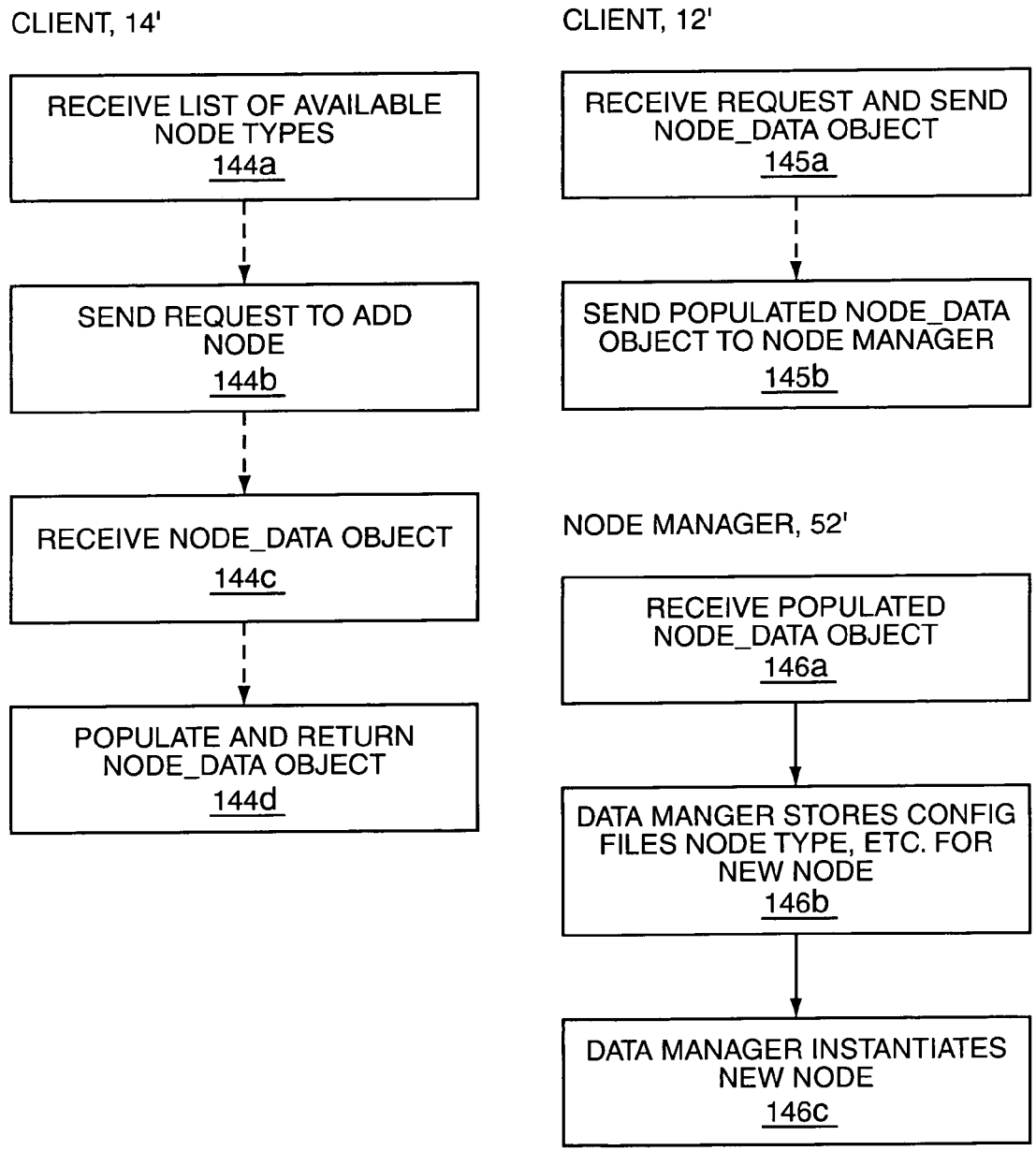
FIG. 12A is a flow chart showing node manager administration processing.

As shown in FIG. 12A, aspects of the administrative client process 14', server process 12' and node manager process 52' are shown. The administrative client process 14' obtains 144a a list of available node types from the administrative server process 12'. The administrative client process 14' sends 144b a request to add a node. In response, the administrative server process 12' sends 145a a node_data object, which is received 144c by the Admin client 14'. The administrative client 14' sends back 144d the node_data object populated with configuration data. The administrative server process 12' sends 145b the node_data object to the appropriate node manager 52. The appropriate node manager 52 receives 146a the node_data object. The Node_data object writes the configuration files, while the node manager stores 146b the node type and id in the node list file and instantiates 146c the new node. The new Node reads the configuration file data at start up.

The administration server process 12' is a middle layer between the Admin client process 14' and Node Managers 52. The administration server process 12' receives messages from the Admin client process 14', and distributes commands to the appropriate NM(s) 52. The administration server process 12' maintains current data on the state of the nodes in the system, master Data flow configuration for the system and addresses of node host computers and configurations of their Node Managers 52. The admin server process 12' will have one entry in admin server RMI registry 12a. When the Admin client process 14' applet is executed, it will look for an RMI registry 12a on the server host 12, and get references to the object bound as the admin server 12.

The GUI can be implemented as a Java® Sun Microsystems, Inc. applet or a Java® Sun Microsystems, Inc. application inside a web browser. Other techniques can be used. Some embodiments may have the GUI, when running as an applet, execute as a "trusted" applet so that it will have access to the file system of the computer on which it executes. When run as an applet, it uses a web browser, e.g., Microsoft Internet Explorer or Netscape Navigator or Communicator and so forth. The Admin Client 14 thus is a web based GUI which is served from the AS machine via a web server.

The primary communications mechanism is Java Remote Method Invocation (RMI) Java® Sun Microsystems, Inc. Other techniques such as CORBA, OLE® Microsoft, etc. can be used. The Node Manager on each machine will provide an RMI registry on a well-known port, and it will register itself in the registry. The Admin Server will also provide a registry that the Admin GUI will use to communicate with the Admin Server. The Administration server allows the user to perform four types of management, Data Flow Management to direct the flow of data through a node chain, Node Configuration to provide/alter configuration data for specific nodes, Process Control to start/stop specific nodes and Status Monitoring to monitor the operational status of the processes in a system.

During operation, a user may need to install additional components. The components along with the GUI components will get installed on the server and information regarding the additional components might also get installed on the server system. The client will download those GUI components from the server and be able to bring them up in a window and the user will be able to administer those new nodes as though they had always been there. The process can be reconfigured dynamically while the GUI and system are operating. While the GUI is running, the administrative client may need any new GUI components in order to perform administrative functions. The GUI uses Java class files that are executable code residing on the server that can be dynamically downloaded from the server to the client. The client can load the class files, instantiate them and execute them. This approach allows the GUI to be updated without requiring a shut down of the system.

The Java class files provide functionality and can be loaded one at a time or multiple files at a time. These files are used to configure the client and can be changed dynamically while the client is running. That is, Java class file is a file stored on the server that is used to configure the client. The class file is not the configuration file, but contains the executable program code used to configure the client.

There will be multiple class files stored on the server that will be requested by the client. The requested files are downloaded to the client. The client can load them and execute them. While the GUI is running a user can add new class files to the server. The next time those class files are downloaded there will be a change in the client GUI configuration. The client can query the server for a complete list of those class files at any time. If there are new ones present, the client can request them.

The Admin Client (AC) is a Java browser Applet that is served from an Admin Server hosted by a web server. Upon loading, the Admin Client obtains a reference to the Admin Server from the server's RMI registry, and sends commands to the Server via RMI. The AC provides Displays Data Flow configuration data and Node configuration data in the table. The AC accepts administration commands from the user and issues administration commands to the server. The AC processes events from the server and updates a display and displays the log files of Node Hosts and Nodes.

Figure 13A:
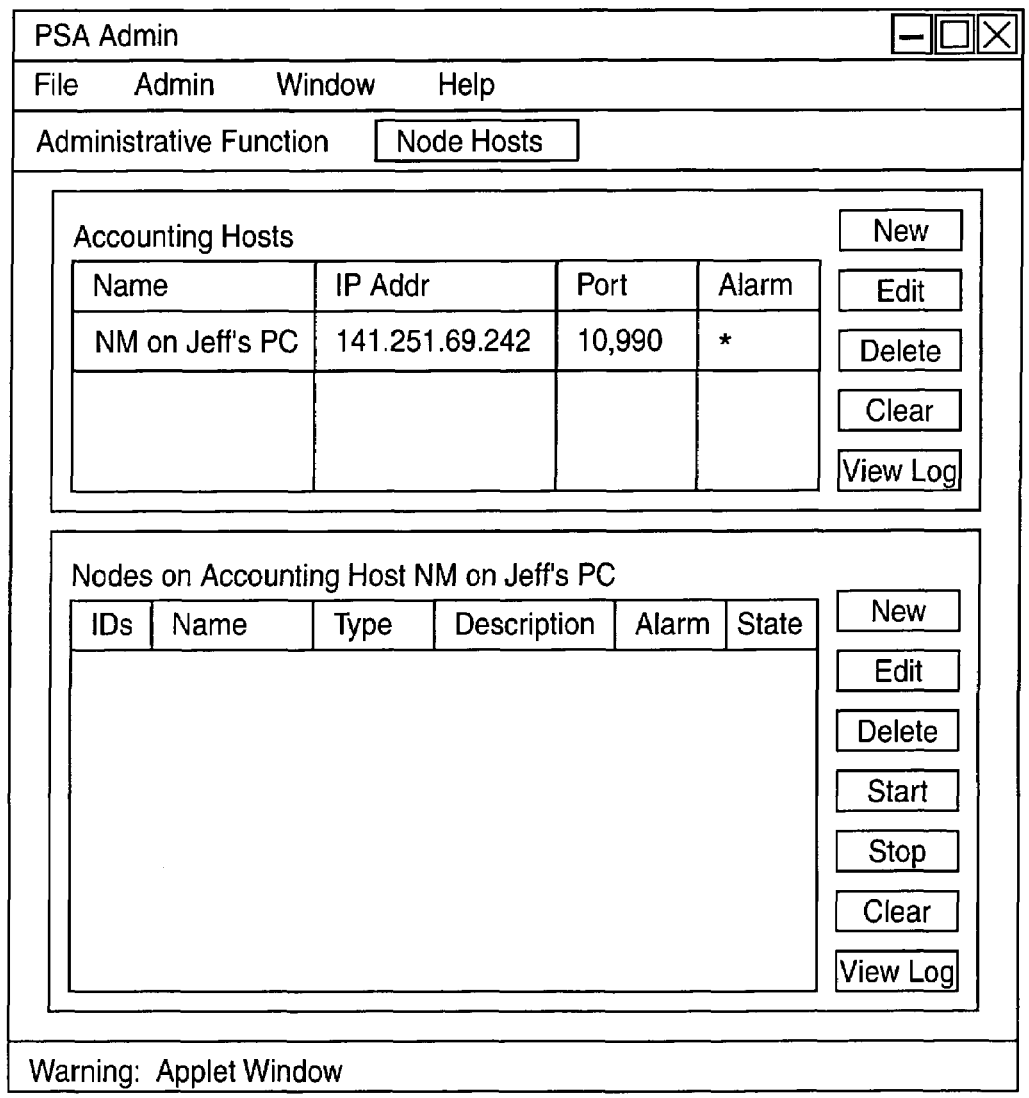
Figure 13B:
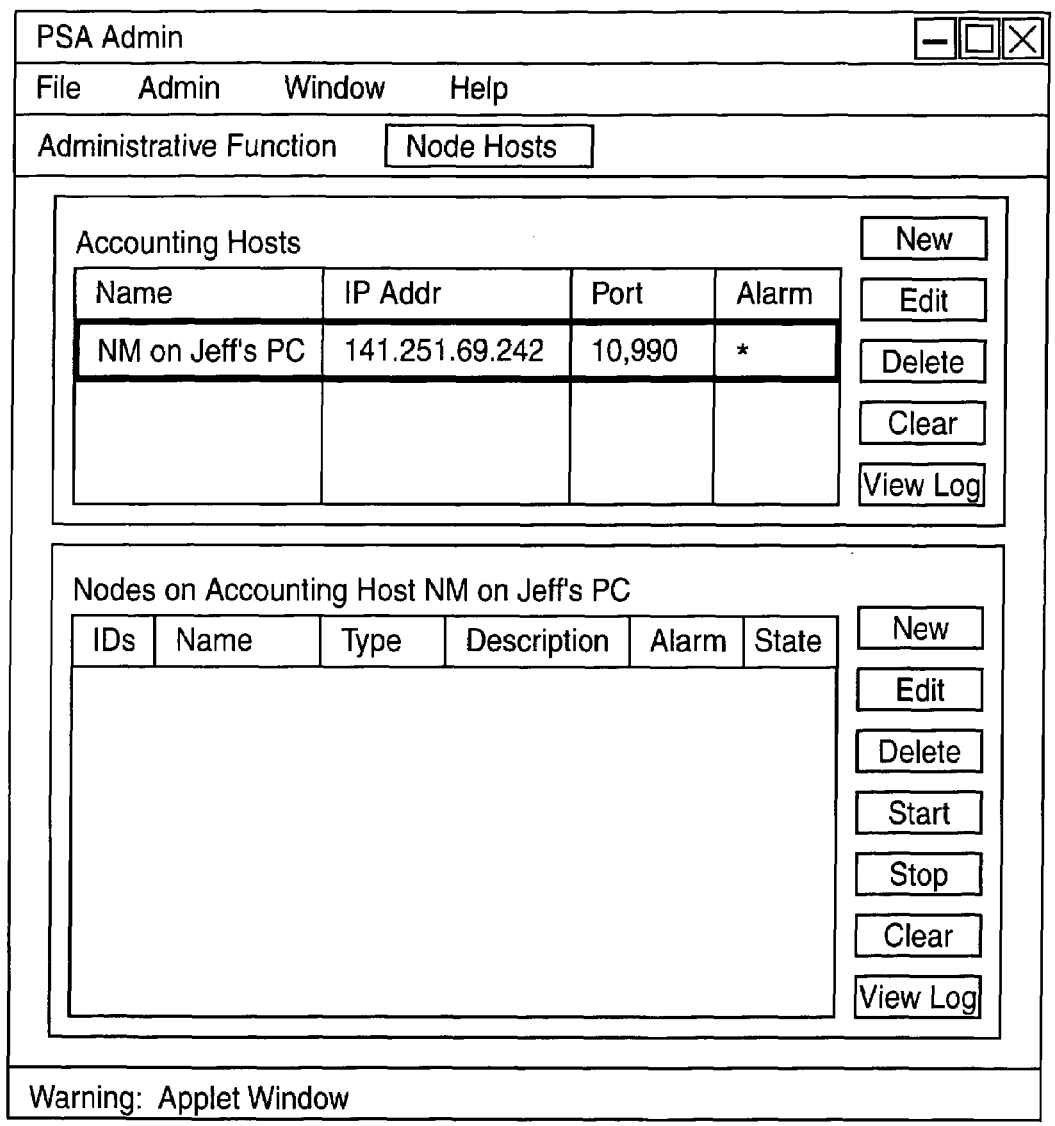

Referring to FIGS. 13A–13J, exemplary screen shots of client GUI are shown. For example, the GUI when used to administer nodes has an area where accounting hosts are listed and nodes (none shown) on a select host are depicted as shown in FIG. 13A. The accounting hosts list shows IP address, port and an alarm value. The nodes on the accounting list would show the name, type destination, alarm, state. As shown in FIG. 13B, the GUI also allows for addition of a new node, or editing, or deleting nodes. In addition the GUI allows for clearing alarms and viewing a log. Similar values are provided for the nodes on accounting hosts in addition to stopping and starting a node.

Figure 13C:
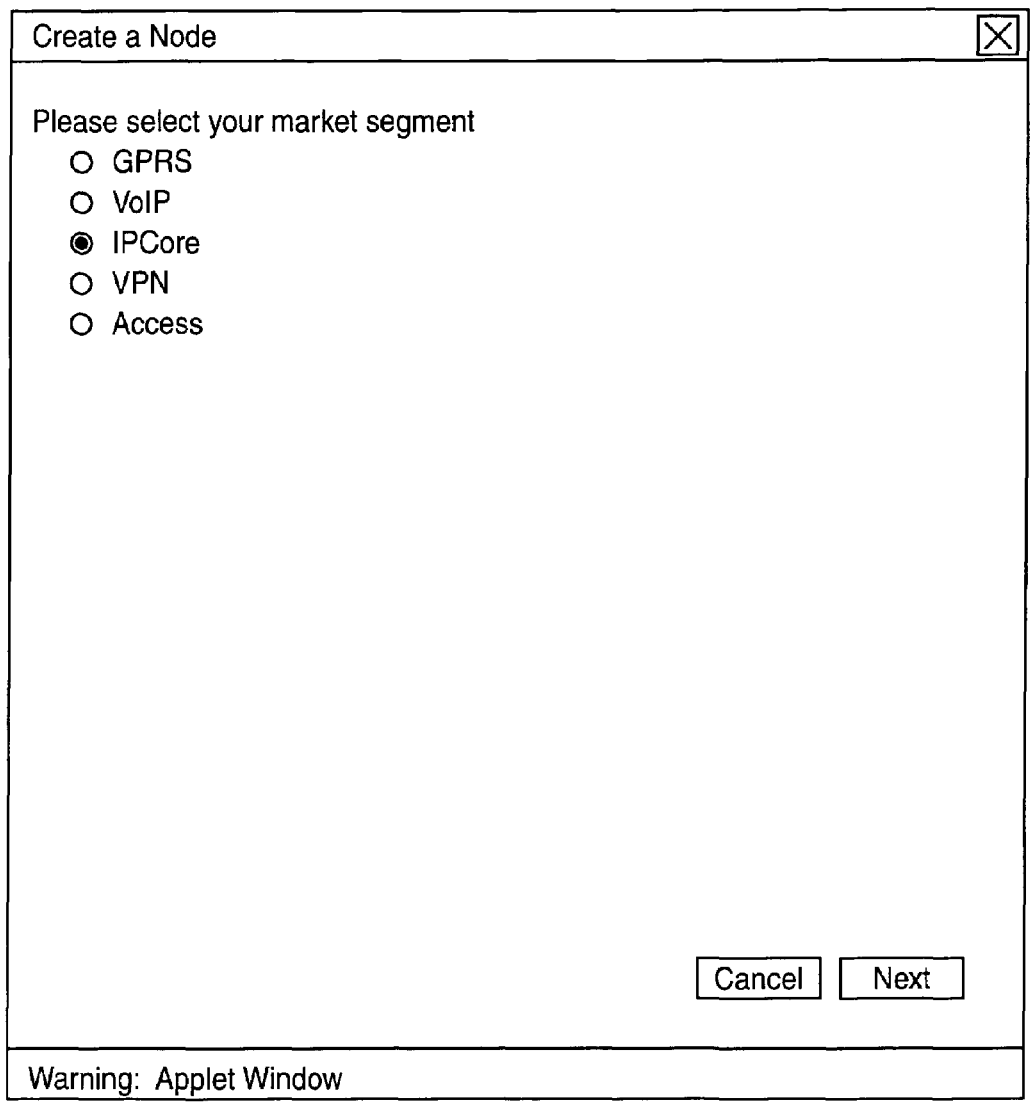
Figure 13D:
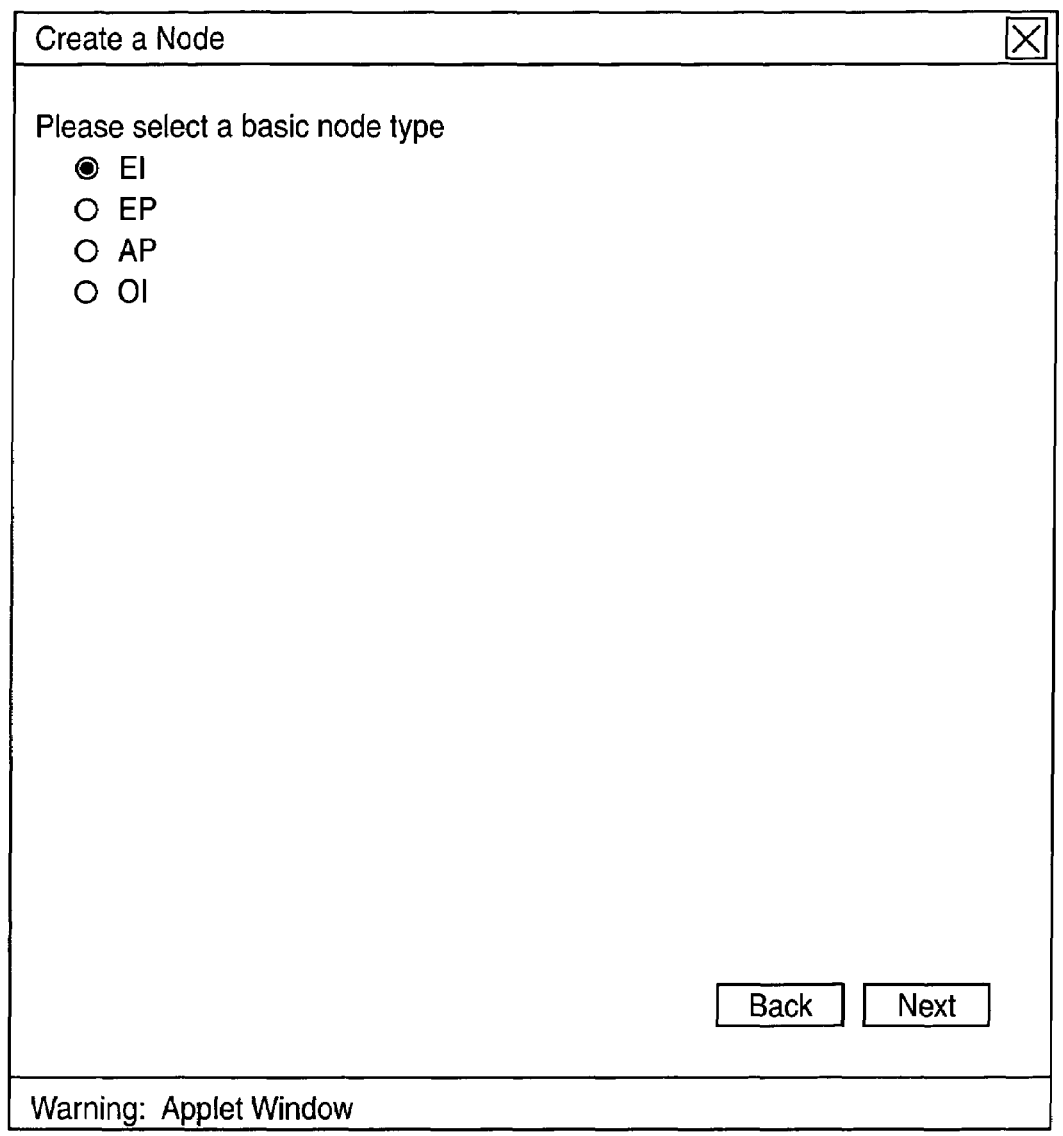
Figure 13E:
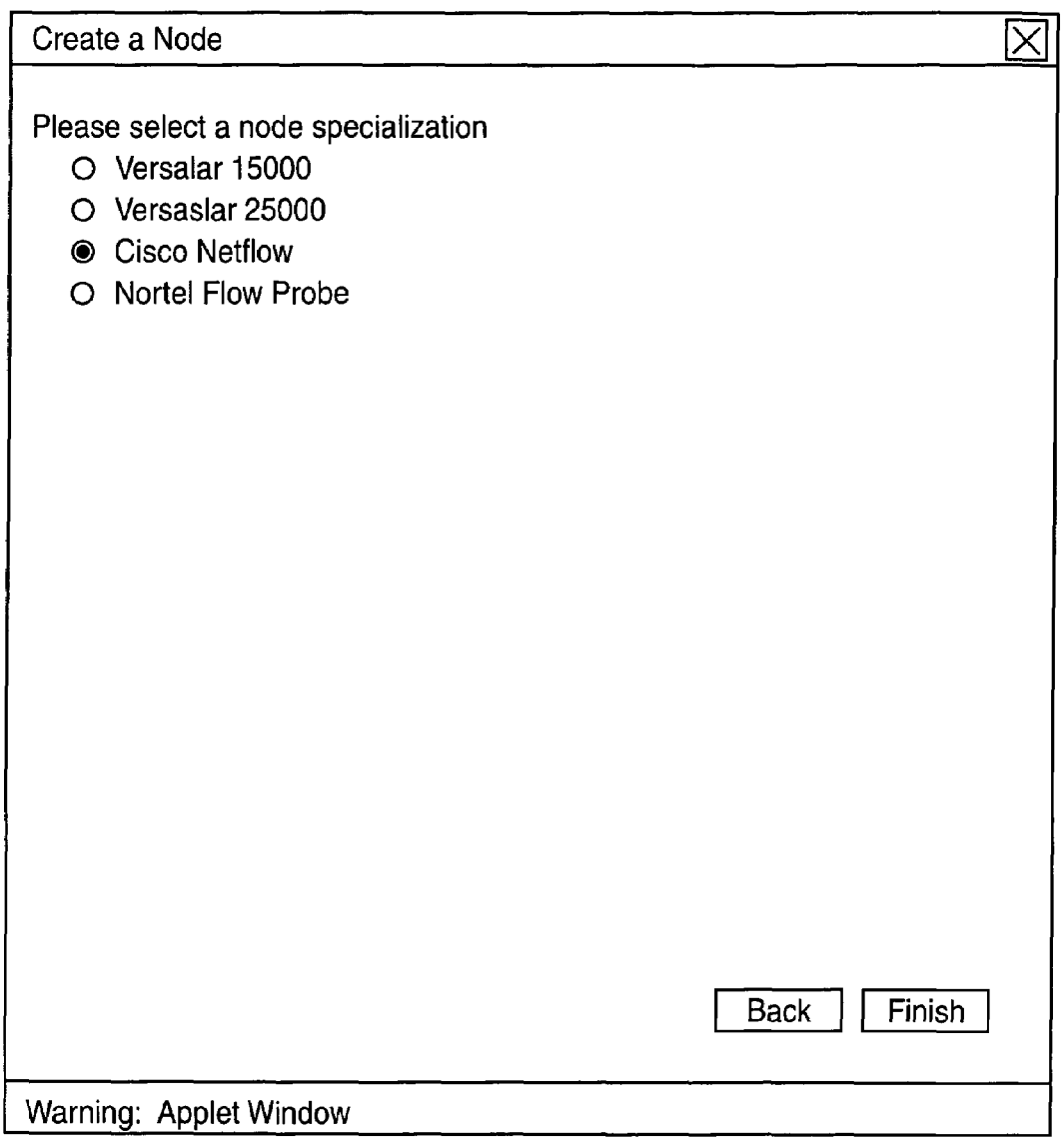

As shown in FIGS. 13C–13E, when the control to produce a "new" node is selected a Node Creation Wizard is launched. The Node Creation Wizard allows a user to configure a new node by specifying a service solution, e.g., GPRS, VoIP, IPCore, VPN and Access, a node type, e.g., EI, EP, AP, OI and a node specialization Versalar 15000 Versalar 25000, Cisco Netflow, Nortel Flow Probe, etc.

Figure 13F:
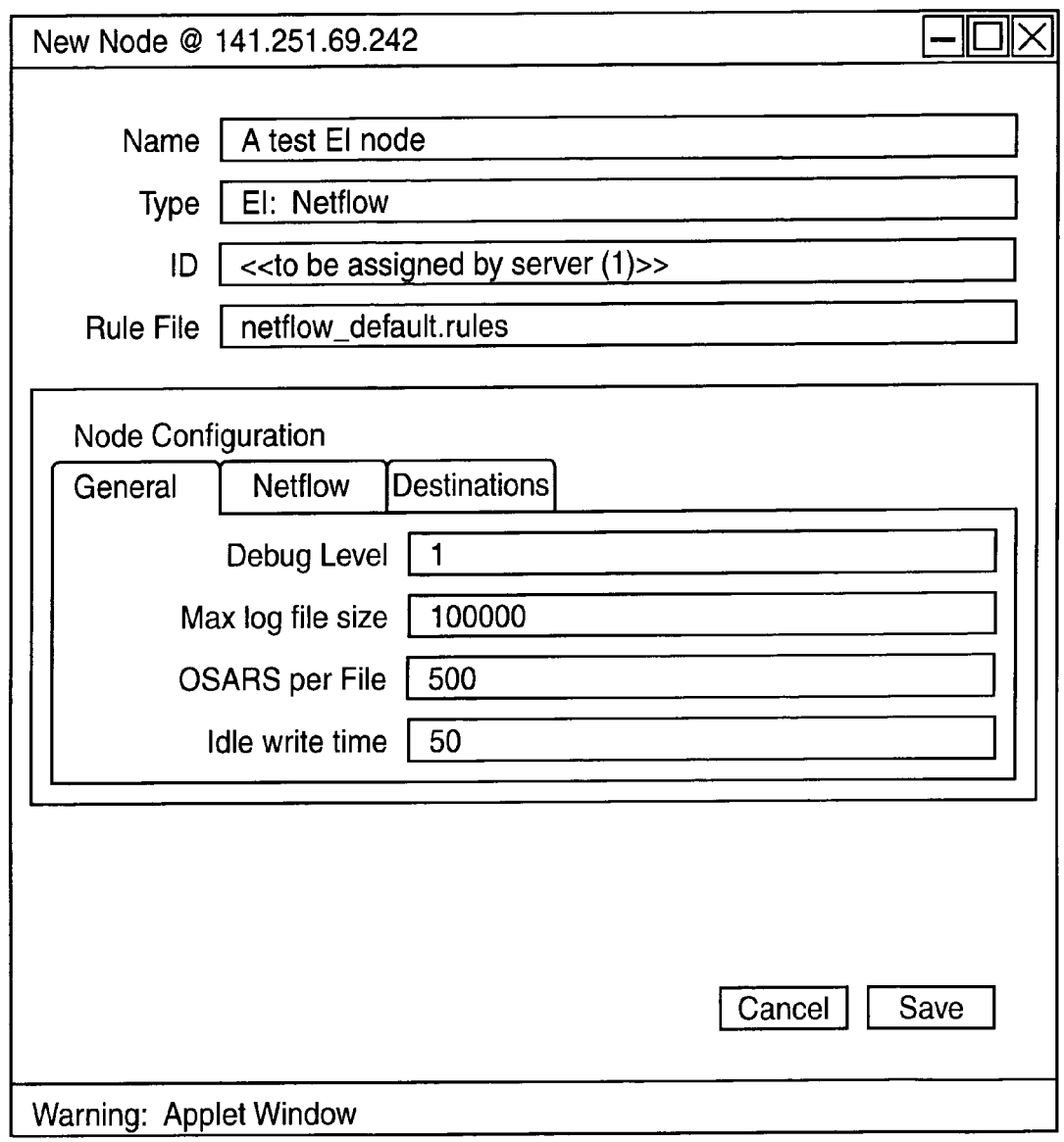
Figure 13G:
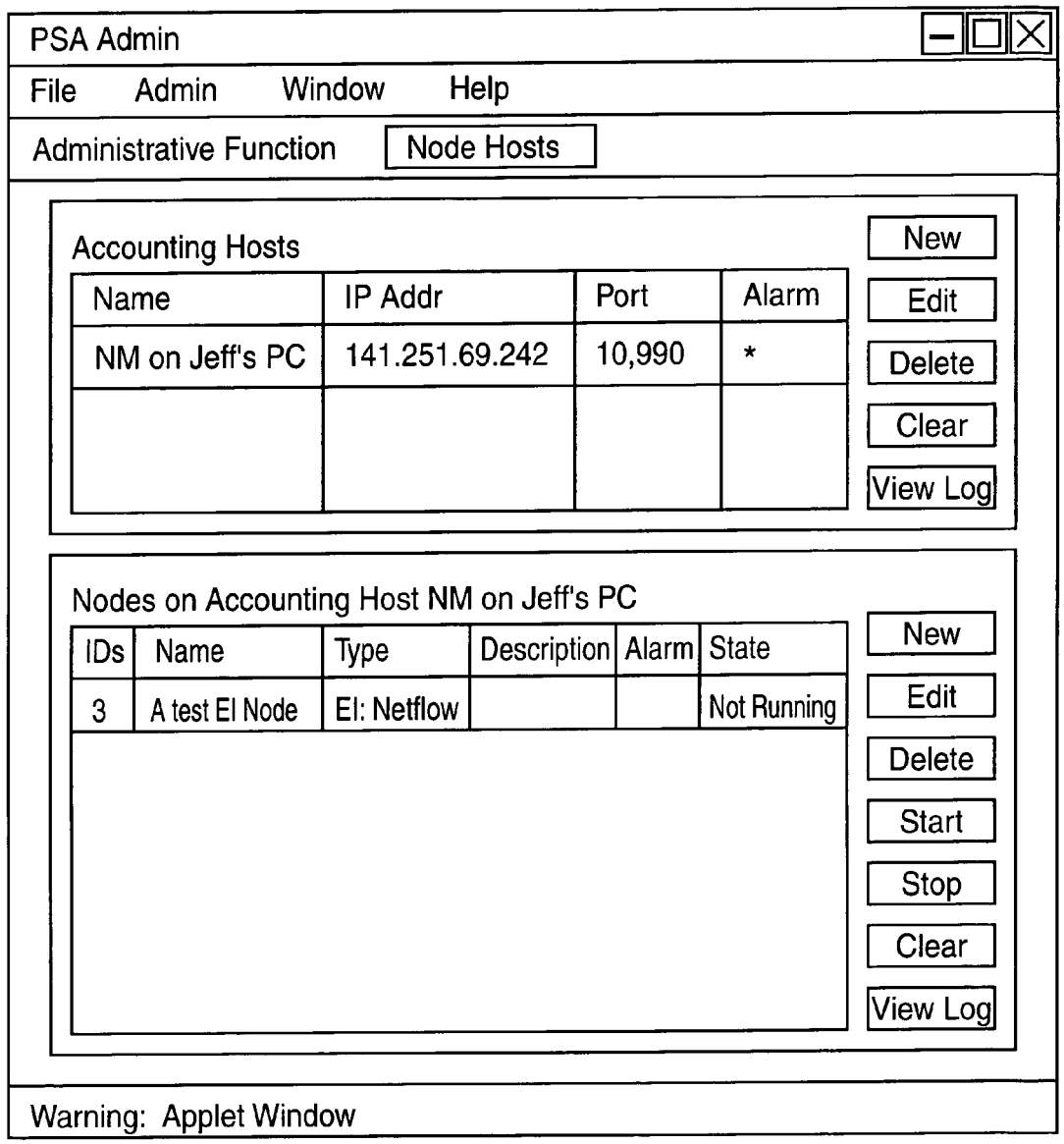
Figure 13H:
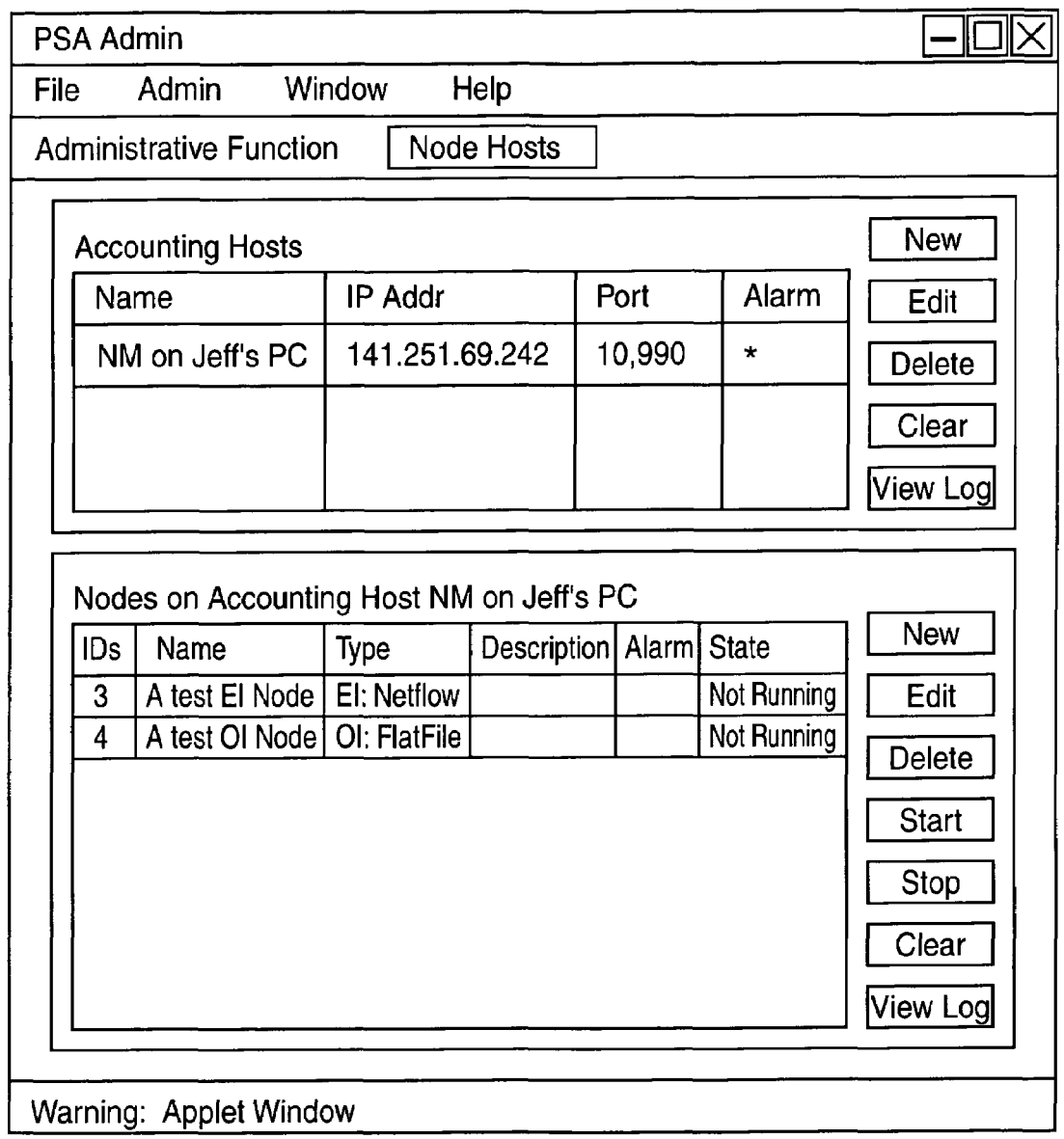

After the user completes the Node Creation Wizard, a node configuration dialog FIG. 13F is launched to allow the user to make adjustments to a default configuration for the new node. As shown in FIGS. 13G and 13H, the node host screen will show the new nodes. FIG. 13G shows a new "node 3" and FIG. 13H shows "node 3" and a new "node 4."

Figure 13I:
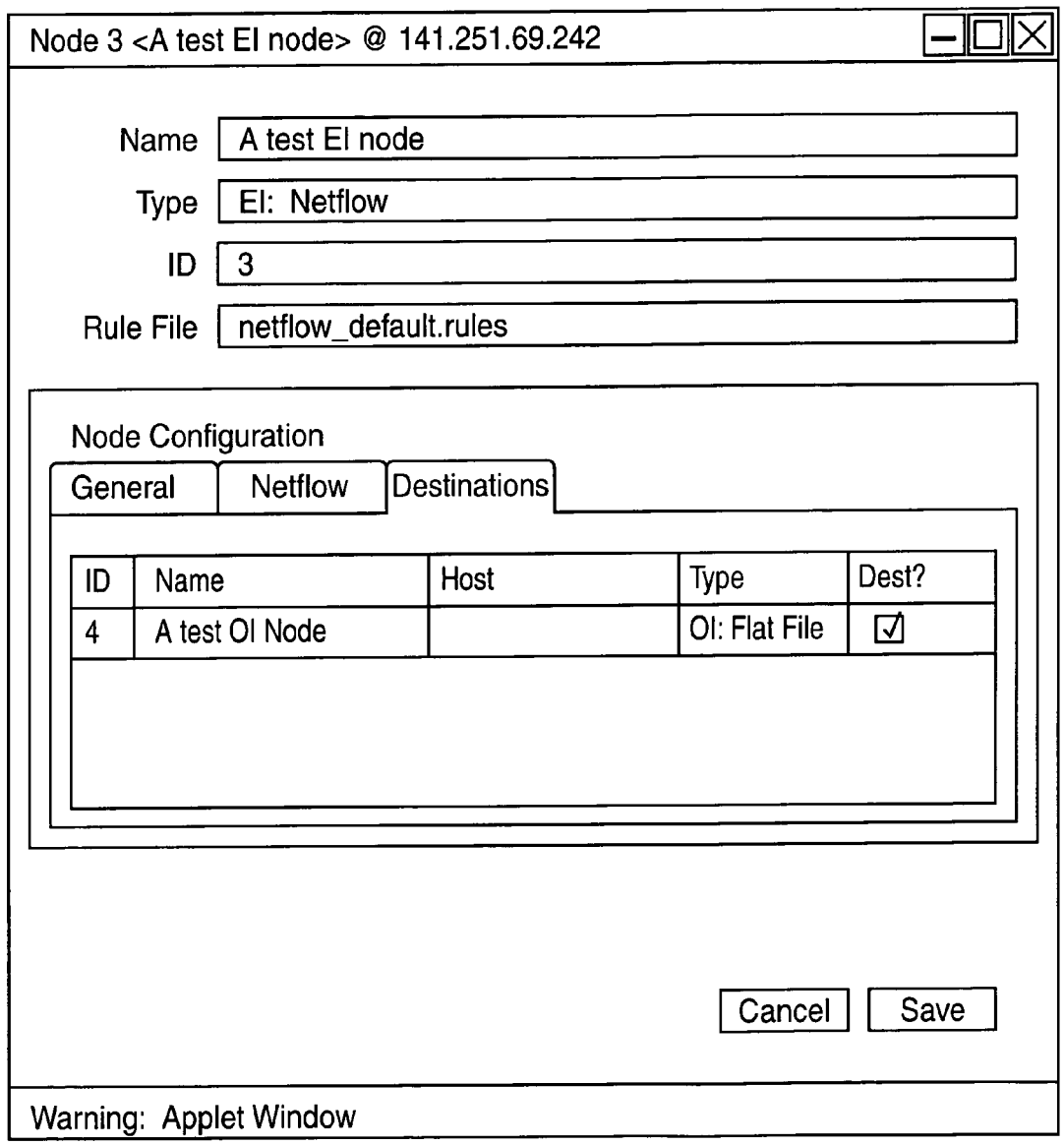
Figure 13J:
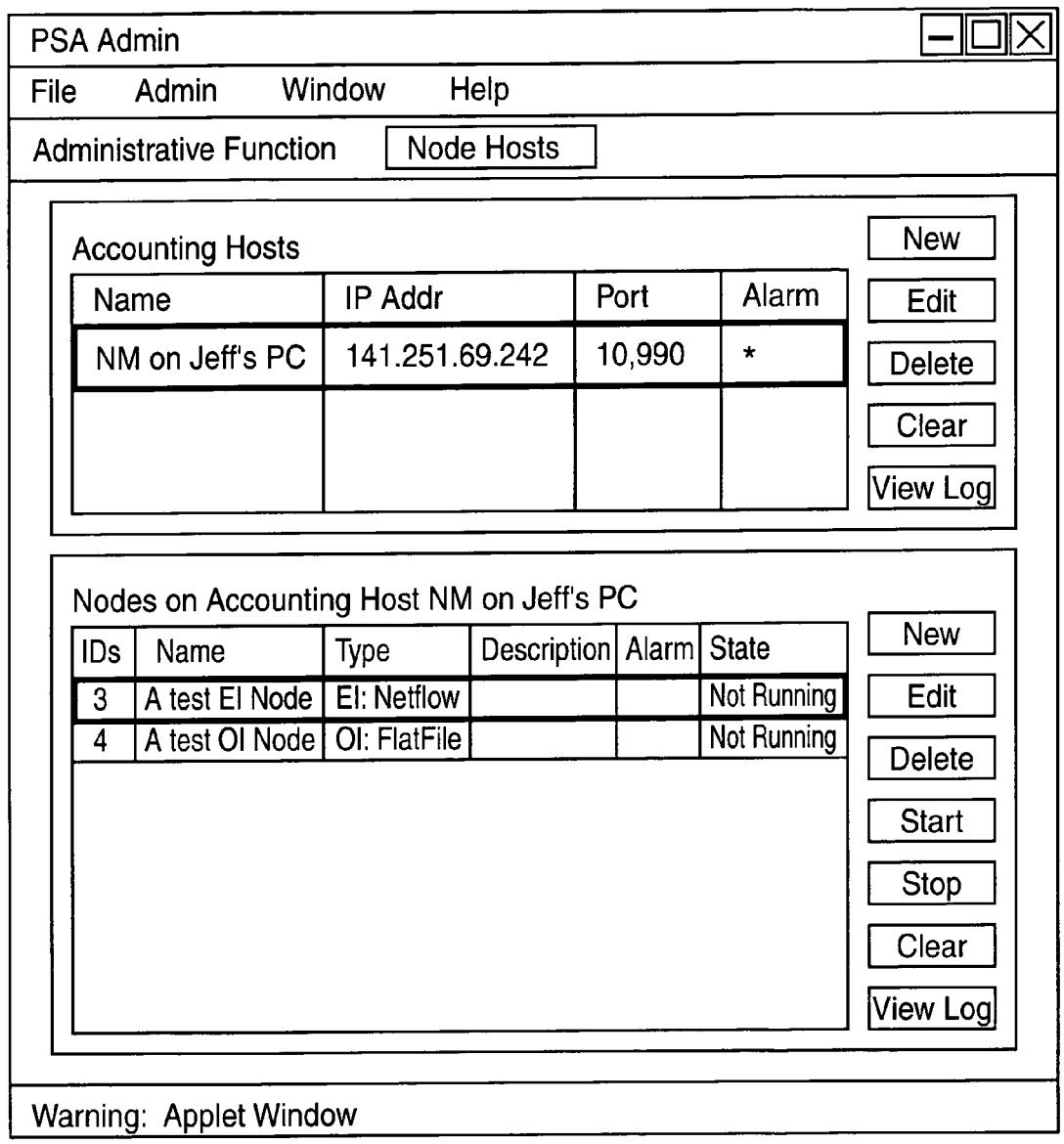

As shown in FIG. 13I, the node configuration allows a user to specify which nodes are to receive output NARS from the node or to specify output format e.g., flat file format, as shown. Selection of a destination defines a node chain. Thus, as shown in FIG. 13J node 3 has node 4 as a destination. The user may specify target nodes that reside on the same host as the producer node, or on a remote host. FIG. 13K shows a log file from the above examples (after adding node 3 and node 4).

Referring to FIG. 14, the Admin Client process 14' also provides a view of the system in the form of a table. This table depicts the Data Flow Map and the Node Location information.

Figure 15:
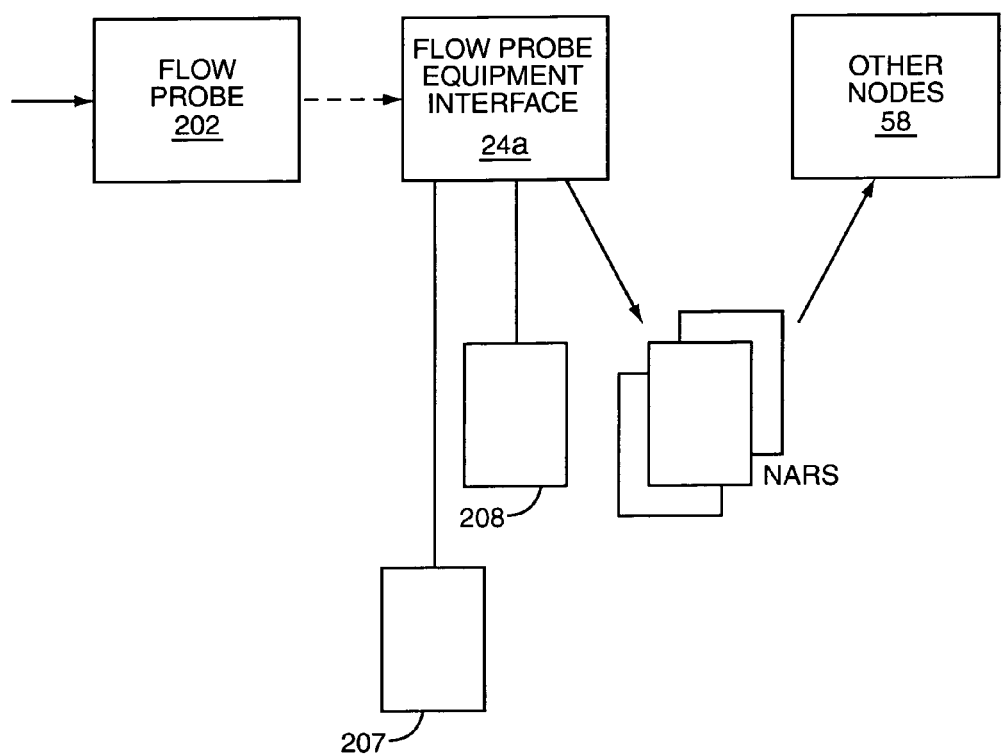
FIG. 15 is a block diagram showing a probe used in the system of FIG. 1.

Referring to FIG. 15, the accounting process can also read NARS from a Probe (FP) 202 and from devices with embedded probe algorithms. The FP 202 operates by continually monitoring network traffic, and writing generated NARS out to a TCP socket. The accounting process 20 receives data from a probe 202 through a FP equipment interface EI, e.g., 24a. The FP EI 24a will open the connection 204 to the FP 202 and read the FP NARS, translate them to NARS, and send them to other nodes 58 on the accounting process 20. The FP EI 24a requires two files, a General configuration file 207 that contains EI configuration information and format rules file 208 that contains NAR format information.

Several Output Interfaces are included in the Accounting process such as a database OI that writes NAR records into an database table. The OI will scan its input area periodically. If the OI finds an NAR file, it will parse the information out of the NARS, create a bulk SQL statement, and bulk insert the information into a table. If it can not successfully write into the DB, the OI will disconnect from the DB and return to its sleep state. It will then resume normal operation. Once the contents of a NAR file have been inserted into the table, the NAR file will be deleted from the input area. If the entire file was not inserted successfully, it will not be removed. The database OI requires two configuration files a general configuration file and a format rules file. The configuration file elements can include elements that are specific for the database OI in addition to the common configuration elements previously described. The format rules file maps NAR attributes into database table columns.

The Flat File OI converts NARS into records for storage in a flat file format. The admin user specifies the queue to which files will be output, and the frequency with which new output files are created. The Flat File OI requires two configuration files the general configuration file and the format rules file. The configuration file elements can include elements that are specific for the Flat File OI in addition to the common configuration elements previously described. The format rules file maps NAR attributes into fields in records of a flat file. Other OI types to interface to other destination devices/processes can be used.

The Aggregation Node aggregates NARS based on specified matching criteria. The criterion for aggregating one or more NARS is that the value/s of one or more field/s in the NARS are identical. For example, the set of fields Source-IP-Address, Source-IP-Port, Destination-IP-Address, Destination-IP-Port and Timestamp, together signifies a specific IP-Flow. The NARS associated with a specific IP-Flow has identical values in these five fields and hence are candidates for aggregation.

The Aggregation Node allows a set of operations on any number of NAR fields as the Aggregation action. For example, the Bytes-In, Bytes-Out fields can be "Accumulated" from the NARS with matching IP-Flow Id (combination of the five fields described above), and start times. The Rule Based Aggregation Node allows users to specify the matching criteria (as a list of NAR attributes) and the corresponding action (field-id, action pair) on multiple fields through an Aggregation Rule file. The users can select an action from the list of Aggregation Actions (such as Accumulate, Maximum, Minimum, Average etc.) allowed by Accounting process. In case a match for an NAR is not found, the NAR is stored in the look-up table for matching with subsequent NARS with the same id.

Periodically, an Aggregation Node suspends its Input Reader and continues aggregating all the NARS that are present in its look up table. Once the Aggregation Node finishes aggregating all the NARS that are in its look-up table, it writes the aggregated NARS out using its Output Writer. These aggregated NARS have a new NAR Id having the aggregated fields. The Aggregation Node then resumes its Input Reader and continues with its regular operation.

Aggregation Rules include a specification of the NAR fields that form the matching key and the corresponding field-id, action pair/s. In case the matching key has more than one NAR field-id, they are separated by comma. The matching key and the field-id, action pair/s are separated by one or more space/s, whereas the field-name and the action-id are separated by a comma. In the case where more than one field-id, action pair is specified, the items are separated by semi-colons. A Aggregation Node does aggregation for a SINGLE matching key. Consequently, a Aggregation Rule file can contain only one matching key and its corresponding field-id, action pair list.

At Start Up, a Aggregation Node, reads its rule file and produces internal data structures which signify the component's NAR Field-Ids of the matching key and also signify the PSA-Field-Id, action pairs, that is, what action will be taken on which Field-Id, if an incoming NAR key matches with the key of an NAR in the Aggregator's Look-Up table. The Aggregation node reads an Input NAR, extracts NAR fields that form the key for this aggregator and forms a hash-key object using these fields. The aggregation node determines if the there is a record in the aggregation look-up table matching that of the key. If no match is found, the aggregation node inserts the NAR in the Look-Up table using the formed key. If a match is found, the aggregation node applies specified actions to each of the PSA-Field-Ids specified in the Field-Id, action pair list. If the input NAR is a "Flow-End" NAR, the aggregation node creates a new NAR, writes it out and removes the aggregated NAR from the Aggregator Look-Up table. As mentioned above the aggregation node can suspend its Input Reader and for each of the (unique) NARS in the Aggregator Look-Up table, produces a new NAR, Re-Initialize each of the fields specified in the Field-Id, action pair list and writes the new NAR out. Thereafter, the aggregation node will resume the Input Reader.

Enhancement nodes serve to transform NAR records in some way. Possible enhancement functions may include, but are not limited to Normalization/Splitting that produce multiple NARS from a single NAR (1 to many), Attribute addition that adds an attribute to a NAR (1 to 1) based upon certain criteria, Filtering out attributes in NARS or Filtering out NARS from the data stream and routing NARS to different destinations base upon whether a certain attribute exceeds some threshold.

The following illustrates an example of configuration files that would configure an enhancement node to do IP-to-Group enhancement. The goal of this enhancement node is to add a group attribute to each NAR that is processed. In this case, the group data comes from a static table that is set up by the admin user. The Enhancer node parses a configuration file with the following syntax. Each row of the configuration file will have attribute identifies SourceFieldId, DestinationFieldId or DestinationFieldType followed by the value associated with that attribute where the source-FieldId is the id of the NAR attribute that will be used as the key to the enhancement process. The source Field ID attribute contains an IP address. A DestinationFieldId is the id of the NAR attribute that will be the destination of the value of the enhancement process, that is, it will be populated with the Group ID number.

The IP to group Enhancer parses a file where each row inclusively maps a contiguous range of IP addresses to a user defined group. The first column of the row will indicate the starting IP address of the range the second column indicates the ending IP address of the range and the last column associates the IP range to a group.

| | | |
|---|---|---|
| 192.235.34.1 | 192.235.34.10 | 1 |
| 192.235.34.11 | 192.235.34.20 | 2 |
| 192.235.34.21 | 192.235.34.40 | 4 |
| 192.235.34.41 | 192.235.37.60 | 6 |

Figure 16A:
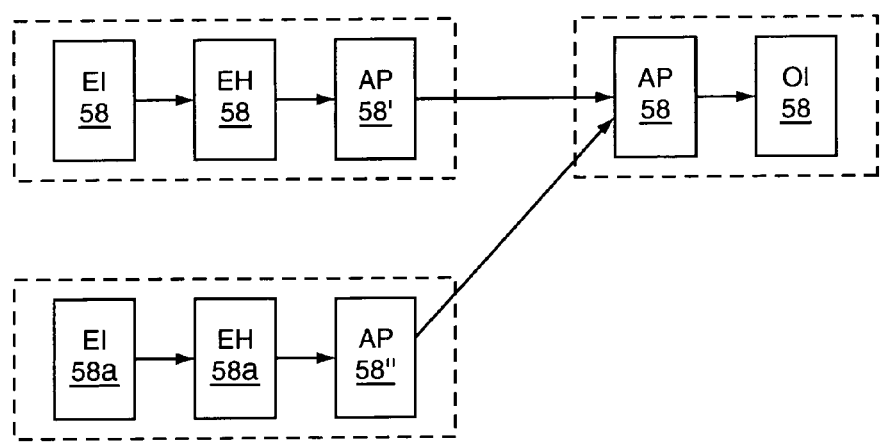
FIG. 16A is a block diagram useful in understanding a node deletion process.
Figure 16B:
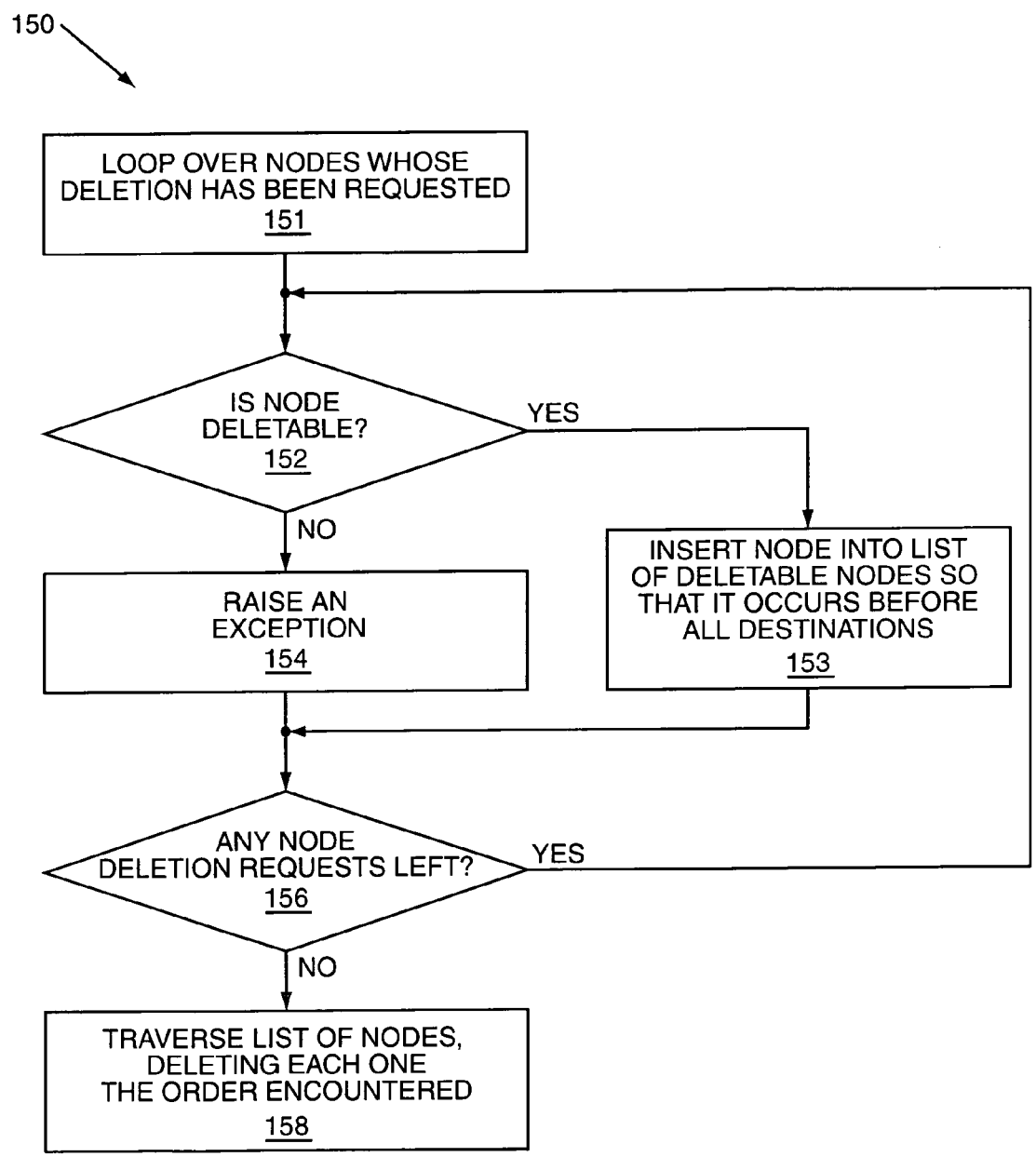
FIGS. 16B and 16C are flow charts showing a node deletion process.
Figure 16C:
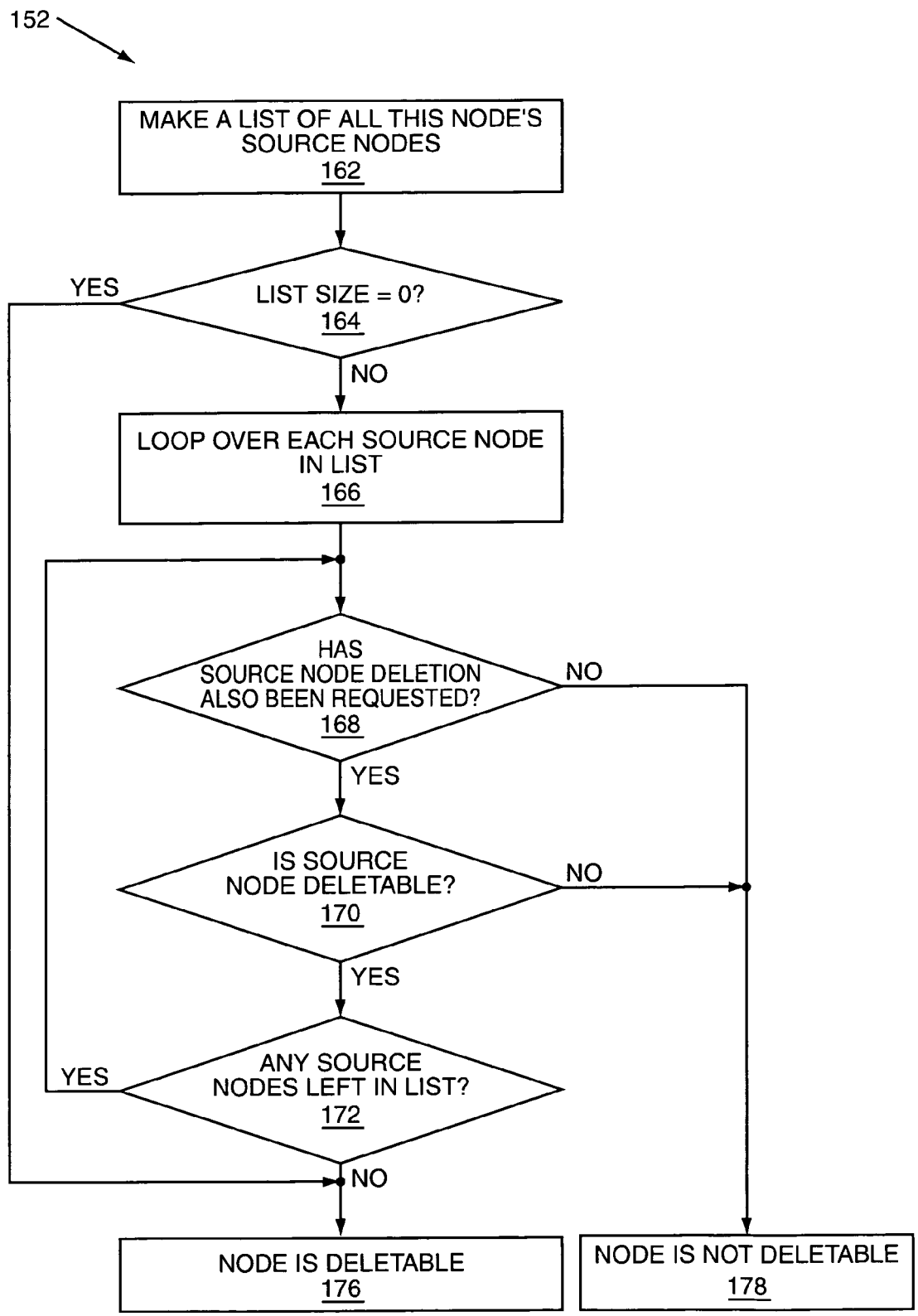

Referring to FIGS. 16A–16C, nodes of the Accounting process 20 are connected such that one node 58 sends data to another node 58. A user might desire to delete one node 58' of the nodes 58 in the accounting process 20. To safely delete a node 58', a process 150 (FIG. 15B) determines if a user requested node 58' can be safely deleted from the accounting process 20. The process 150 determines whether that node 58' is receiving data from another node 58a. As shown the node 58' is receiving data from others nodes 58a. Deletion of the user-specified node 58' will disrupt system operation and possibly cause loss of data and therefore the process will raise an exception.

However, as shown for node 58" if the user has also requested deletion of source nodes 58a, then both nodes 18a and node 58" can be deleted with neither system disruption nor loss of data, so long as the source nodes 58a are deleted prior to the receptor node 58". Such source-receptor relationships among nodes may involve more than two nodes and may be complex. Determining whether the deletion of a set of user-specified nodes will cause system disruption is non-trivial. The system responds to user requests for node deletion by determining whether to delete the specified nodes, or to refuse the deletion and instead alert the user to the system disruption that would otherwise occur. If system determines that specified nodes 58' may be safely deleted, the system also determines a sequence in which the nodes may be safely deleted.

Referring to FIG. 16B, the process 150 loops 151 over nodes whose deletion has been requested and determines 152 for each node whose deletion has been requested whether the node is deletable. If the node is deletable, the system adds 153 the node to a list of deletable nodes. The process 150 maintains this list in an order such that a list traversal will encounter all source nodes before their respective receptor nodes. If the node is not deletable, the process 150 will raise an exception 154. The process 150 will determine if any node deletion requests remain 156. If yes it will return to determine if the node is deletable and if not will proceed to delete nodes. To actually delete nodes, the process 150 traverses 158 the list of deletable nodes and deletes each node in the order in which the node is encountered.

Referring to FIG. 16C, the process 152 to determine whether a node is deletable produces 162 a list of all of the candidate node's source nodes. If the size of that list is zero 164 then this node is deletable 176. Otherwise, loops 166 over each source node in the list for each of the candidate nodes. The process 152 determines 168 if the source node's deletion has been requested. If the source node's deletion has not been requested then the candidate node is not deletable 178. The process determines 172 if there are any source nodes for that candidate node left in the list. If there are no more source nodes left in the list and all of the source nodes of the candidate node were deletable 170, then the candidate node is deletable 176. The process 152 will return to either raise an exception 154 or insert the node in the list of deletable nodes 153 as in FIG. 16B.

This provides a technique for safely deleting a node in a distributed data collection and processing system while insuring that data is not lost. Since the data collection system 10 can have nodes chained together so that data enters a chain and travels through the chain, breaking the chain could cause loss of data. Chains can be a serial node to node to node chains, or tree like structure where some nodes could split data or route data.

However, a network administrator may need make changes to the node configuration of the system 10 that might involve adding nodes, deleting nodes, rerouting data, etc. In the particular case of deleting nodes, there could be a problem if the system 10 allowed deleting any node at any time. This could result in loss of data.

If a node is receiving data from another node, and routing NARS to a different node, deletion of the node will break the chain between the nodes. The node upstream from that node will have its output queue fill up while data in the queue is not being removed and ultimately that data will be lost. Anytime the user requests that a node be deleted the system determines if this is in fact a safe or unsafe request. If its an unsafe request, the system raises the exception which can be a dialogue box telling the user of the condition and requiring the user to reroute data before removing the node.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Figure 17:
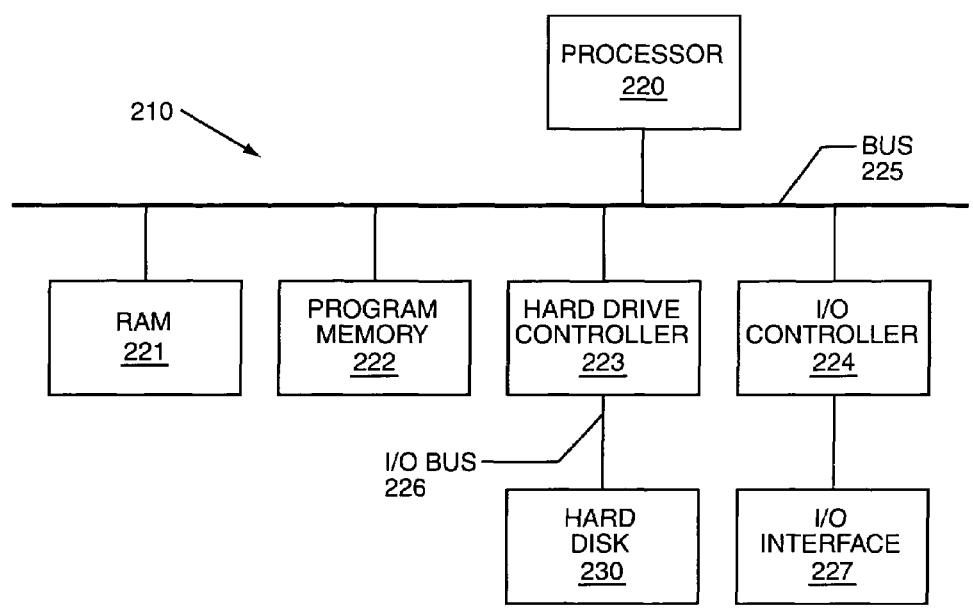
FIG. 17 is a block diagram of a computer system that can implement node hosts and servers for the system.

An example of one such type of computer is shown in FIG. 17, which shows a block diagram of a programmable processing system (system) 210 suitable for implementing or performing the apparatus or methods of the invention. The system 210 includes a processor 220, a random access memory (RAM) 221, a program memory 222 (for example, a writable read-only memory (ROM) such as a flash ROM), a hard drive controller 223, and an input/output (I/O) controller 224 coupled by a processor (CPU) bus 225. The system 210 can be preprogrammed, in ROM, for example, or it can be programmed (and reprogrammed) by loading a program from another source (for example, from a floppy disk, a CD-ROM, or another computer).

The hard drive controller 223 is coupled to a hard disk 230 suitable for storing executable computer programs, including programs embodying the present invention, and data including storage. The I/O controller 224 is coupled by means of an I/O bus 226 to an I/O interface 227. The I/O interface 227 receives and transmits data in analog or digital form over communication links such as a serial link, local area network, wireless link, and parallel link.

One non-limiting example of an execution environment includes computers running Windows NT 4.0 (Microsoft) or better or Solaris 2.6 or better (Sun Microsystems) operating systems. Browsers can be Microsoft Internet Explorer version 4.0 or greater or Netscape Navigator or Communicator version 4.0 or greater. Computers for databases and administration servers can include Windows NT 4.0 with a 400 MHz Pentium II (Intel) processor or equivalent using 256 MB memory and 9 GB SCSI drive. Alternatively, a Solaris 2.6 Ultra 10 (400 Mhz) with 256 MB memory and 9 GB SCSI drive can be used. Computer Node Hosts can include Windows NT 4.0 with a 400 MHz Pentium II (Intel) processor or equivalent using 128 MB memory and 5 GB SCSI drive. Alternatively, a Solaris 2.6 Ultra 10 (400 Mhz) with 128 MB memory and 5 GB SCSI drive can be used. Other environments could of course be used.

Other embodiments are within the scope of the appended claims.

What is claimed is:

1. A data processing node comprising:
   a node manager that administers nodes and provides a run time environment for administered nodes, which include;
   a node object to provide specific functional processing, the node object existing as an object within the node manager; and
   a data manager that provides inter-node data communications for remote nodes or local nodes.

2. The data-processing node of claim 1 wherein the node object processes network data.

3. The data processing node of claim 1 wherein the node object is an equipment interface node that processes network data into network records.

4. The data processing node of claim 1 wherein the node object is an enhancement node that modifies a network record.

5. The data processing node of claim 1 wherein the node object is a correlation node that correlates two network records to produce an aggregated network record.

6. The data processing node of claim 1 wherein the node object is an aggregation node that aggregates multiple network records to produce an aggregated network record.

7. The data processing node of claim 1 wherein the node object is an output interface node that processes network records into data that is sent to a data consuming application.

8. The data processing node of claim 1 wherein the data manager comprises:
   a configuration file used to configure the node object; and
   a rules file that determines how the node object processes data.

9. The data processing node of claim 1 wherein the data manager comprises:
   an input queue and an output queue for transferring network records.

10. The data processing node of claim 1 wherein the data manager comprises:
    an input queue and an output queue for transferring network records; and
    a persistent store, to store network records until the records are sent to a succeeding processing node.

11. The data processing node of claim 1 wherein the data manager moves data between the output queue or the input queue of the node object and to an input queue or an output queue of a succeeding node.

12. The data processing node of claim 1 wherein the data manager moves data between the output queue of the node object and to an input queue of a succeeding node.

13. The data processing node of claim 1 wherein the data manager is a local data manager that moves data from the node object to a succeeding node on a common host machine.

14. The data processing node of claim 1 wherein the data manager moves network records and the data manager is a remote data manager that moves records from the node object to a succeeding node that is on a different host machine.

15. The data processing node of claim 11 wherein the data are network accounting records.

16. The data processing node of claim 11 wherein the data are network accounting records are persisted to storage as network accounting record files.

17. A computer program product residing on a computer readable medium for producing a data collection and processing node on a computer device comprising instructions for causing a computer to:
    instantiate a data processing node that comprises:
       a node manager that administers nodes and provides a run time environment for administered nodes, which include;
       a node object to provide specific functional processing; and
       a data manager that provides inter-node data communications for remote nodes or local nodes.

18. The computer program product of claim 17 wherein the node object processes network data.

19. The computer program product of claim 17 wherein the instantiate node object is an equipment interface node that processes network data into network records.

20. The computer program product of claim 17 wherein the instantiated node object is an enhancement node that modifies the network record.

21. The computer program product of claim 1 wherein the instantiated node object is a correlation node that correlates two network records to produce an aggregated network record.

22. The computer program product of claim 17 wherein the instantiated node object is an aggregation node that aggregates multiple network records to produce an aggregated network record.

23. The computer program product of claim 17 wherein the instantiated node object is an output interface node that processes network records into data that is sent to a data consuming application.

24. The computer program product of claim 17 further comprising instructions to cause the computer to:
    set up in a memory a configuration file to configure the node object and a rules file that determines how the node object processes data.

25. The computer program product of claim 17 further comprising instructions to cause the computer to:
set up in a memory a configuration file to configure the node object, a rules file that determines how the node object processes data and a persistent store to store network records until the records are sent to a succeeding processing node.

26. The computer program product of claim 17 further comprising instructions to cause the computer to cause the data manager to move data between an output queue or an input queue of the node object to an input queue or an output queue of a succeeding node.

27. The computer program product of claim 17 further comprising instructions to cause the computer to cause the data manager to move data between an output queue of the node object to an input queue a succeeding node.

28. A data collection system, comprising:
a plurality of interconnected node host computers;
a node manager resident in each of the plurality of interconnected node host computers, said node manager containing at least one processing node object and a data manager, the data manager delivering network records between a first processing node and second processing node.

29. The system of claim 28 wherein the node manager contains first and second processing node objects and within a specified one of the plurality of node host computers the node manager is a local node manager and delivers network records between the first and the second processing nodes.

30. The system of claim 28 wherein within a specified one of the plurality of node host computers the node manager is a remote data manager that delivers network accounting records between a first node object and second node object with one of the node objects being on a different host computer than the remote data manager.

31. The system of claim 28 wherein a user interacting with a graphical user interface client defines at least one chain of processing node objects for transporting at least one network accounting record through the data collection system.

32. The system of claim 28 wherein a user interacting with graphical user interface client defines multiple chains of processing nodes and wherein the multiple processing node chains operate in parallel to allow simultaneous processing of multiple network records.

33. The system of claim 28 wherein the at least one processing node object is an equipment interface nodes for collecting data from outside the data collection system and translating the data into network records.

34. The system of claim 28 wherein the at least one processing node object is an enhancement node for adding attributes to network records.

35. The system of claim 28 wherein the at least one processing node object is an aggregation processor nodes for aggregating a series of network records into a single network record.

36. The system of claim 28 wherein the at least one processing node object is an output interface node for translating network records into an external data format and delivering the translated network record to a destination outside the data collection system.

37. A data collection system comprising:
a plurality of interconnected host computers arranged to receive network data from a network;
at least some of said plurality of interconnected node host computers comprising a plurality of processing node objects to process the network data, said plurality of processing node objects arranged in at least one logical chain of processing node objects where at least some of the processing node objects on the chain perform different processing tasks on the network data.

38. The data collection system of claim 37 wherein the node objects are arranged to provide a network accounting system.

39. The data collection system of claim 37 wherein said plurality of processing node objects arranged in a plurality of logical chains of processing node objects wherein at least some of the processing node objects of one of the chains reside on different host computers.

40. The data collection system of claim 37 wherein the node objects comprise:
an input queue;
an output queue; and
wherein records are moved between the output queue of a source node to an input queue a destination node.

* * * * *